(12) United States Patent
Agee et al.

(10) Patent No.: US 6,889,200 B2
(45) Date of Patent: May 3, 2005

(54) RAPID TAX COLLECTION SYSTEM AND METHOD FOR DEBIT-TYPE TRANSACTIONS

(75) Inventors: Richard Agee, San Diego, CA (US); Carolyn M. Ponder, Antioch, IL (US); Arthur D. Starbuck, Murrieta, CA (US); Clark L. Ballantyne, San Diego, CA (US)

(73) Assignee: Fairshare, LLC, San Diego, CA (US)

( * ) Notice: Subject to any disclaimer, the term of this patent is extended or adjusted under 35 U.S.C. 154(b) by 0 days.

(21) Appl. No.: 10/137,493

(22) Filed: Apr. 30, 2002

(65) Prior Publication Data

US 2003/0014358 A1 Jan. 16, 2003

Related U.S. Application Data

(60) Provisional application No. 60/297,194, filed on Jun. 7, 2001, and provisional application No. 60/306,029, filed on Jul. 16, 2001.

(51) Int. Cl.[7] ............................................. G06F 17/60
(52) U.S. Cl. ....................................................... 705/19
(58) Field of Search ..................................... 705/16–25

(56) References Cited

U.S. PATENT DOCUMENTS

| | | |
|---|---|---|
| 3,944,801 A | 3/1976 | Montana |
| 3,946,217 A | 3/1976 | Tsujikawa |
| 3,946,220 A | 3/1976 | Brobeck |
| 3,963,910 A | 6/1976 | Enomoto |
| 5,138,549 A | 8/1992 | Bern |
| 5,220,501 A | 6/1993 | Lawlor et al. |
| 5,335,169 A | 8/1994 | Chong |
| 5,396,417 A | 3/1995 | Burks et al. |
| 5,420,405 A | 5/1995 | Chasek ........................ 235/379 |
| 5,644,724 A | 7/1997 | Cretzler ........................ 705/19 |
| 5,710,887 A | 1/1998 | Chelliah |

(Continued)

FOREIGN PATENT DOCUMENTS

KR                  385315 B  *  5/2003    ........... G06F/19/00

OTHER PUBLICATIONS

"Pilot Status Report", http://www.streamlinedsalestxax.org/pilot3_03.html, Mar. 26, 2003.*
"Frequently Asked Questions About the Streamlined Sales Tax Project", http://www.nga.com, Feb. 23, 2001.*
"Timeline for Simplifying the Nation's Sales Tax System", http://www.nga.com, no date.*
Golden–Murnane, "E–Commerce and Internet Taxation", Jun. 2000, Searcher, vol. 8, No. 6, p. 49.*
McKeown, "Questioning the Viability of the Sales Tax", 2000, Brigham Young University Law Review, vol. 2000, No. 1, pp. 165 183.*

*Primary Examiner*—Bryan Jaketic
(74) *Attorney, Agent, or Firm*—Sheldon & Mak PC

(57) ABSTRACT

Preferred examples of a system and method for rapid collection and distribution of taxes are disclosed. The disclosed embodiments of the present invention provide a system and a method for point-of-sale collection and distribution of sales taxes on a frequent, regular basis, such as daily or weekly, or other periodic time intervals, that can be used for face-to-face, e-commerce, telephone or other transactions. The disclosed embodiments provide a system and a method for transferring funds from numerous merchants to numerous taxing authorities in an efficient manner, with each merchant seeking to transfer funds to perhaps several taxing authorities and each taxing authority seeking to receive funds from many merchants. According to other examples of the invention, a centralized distribution feature allows the merchants and the taxing authorities to each communicate with a single entity or other in transferring the funds. Therefore, efficient tax collection and distribution may be achieved without overburdening either individual merchants or individual taxing authorities

104 Claims, 20 Drawing Sheets

U.S. PATENT DOCUMENTS

| | | | |
|---|---|---|---|
| 5,774,872 A | 6/1998 | Golden | |
| 5,799,283 A | 8/1998 | Francisco | 705/19 |
| 5,850,217 A * | 12/1998 | Cole | 705/16 |
| 5,875,433 A | 2/1999 | Francisco | 705/19 |
| 5,937,396 A * | 8/1999 | Konya | 705/39 |
| 5,943,657 A | 8/1999 | Freestone | |
| 5,987,429 A | 11/1999 | Maritzen | 705/31 |
| H1830 H | 1/2000 | Petrimoulx | |
| 6,014,636 A * | 1/2000 | Reeder | 705/17 |
| 6,016,479 A | 1/2000 | Taricani, Jr. | 705/19 |
| 6,038,548 A | 3/2000 | Kamil | |
| 6,078,898 A | 6/2000 | Davis | 705/19 |
| 6,078,899 A | 6/2000 | Francisco | 705/19 |
| 6,125,352 A | 9/2000 | Franklin | |
| 6,141,650 A | 10/2000 | Iwasa | |
| 6,202,052 B1 | 3/2001 | Miller | |
| 6,298,333 B1 * | 10/2001 | Manzi et al. | 705/19 |
| 6,304,860 B1 | 10/2001 | Martin, Jr. | |
| 6,347,304 B1 | 2/2002 | Taricani, Jr. | 705/19 |
| 6,360,208 B1 | 3/2002 | Ohanian | 705/28 |
| 6,411,938 B1 | 6/2002 | Gates | |
| 6,473,741 B1 | 10/2002 | Baker | |
| 6,487,540 B1 * | 11/2002 | Smith et al. | 705/21 |
| 2001/0049626 A1 * | 12/2001 | Nicholson | 705/14 |
| 2001/0054023 A1 * | 12/2001 | Murata | 705/39 |

* cited by examiner

US 6,889,200 B2

RAPID TAX COLLECTION SYSTEM AND METHOD FOR DEBIT-TYPE TRANSACTIONS

RELATED APPLICATION

This application is related to, and claims priority under 35 U.S.C. § 119(e) of, U.S. provisional applications Ser. No. 60/297,194, titled "TAX COLLECTION AND DISTRIBUTION SYSTEM", filed Jun. 7, 2001, and No. 60/306,029, titled "TAX COLLECTION SYSTEM", filed Jul. 16, 2001, both of which are hereby incorporated by reference in their entirety. Additionally, the following related U.S. Patent Applications are hereby incorporated by reference in their entirety:

1. U.S. patent application, titled "RAPID TAX COLLECTION SYSTEM AND METHOD," filed concurrently herewith.
2. U.S. patent application, titled "SYSTEM FOR AND METHOD OF RAPID COLLECTION OF INCOME TAXES," filed concurrently herewith.
3. U.S. patent application, titled "RAPID TAX COLLECTION SYSTEM AND METHOD FOR CASH AND CASH-SUBSTITUTE TRANSACTIONS," filed concurrently herewith.

BACKGROUND OF THE INVENTION

1. Field of the Invention

The invention relates to data processing systems and the methods of their use. In particular, the invention relates to a system and method for rapid tax collection and distribution from merchants for debit-type transactions.

2. Related Art

The information contained in this section relates to the background of the art of the present invention without any admission as to whether or not it legally constitutes prior art.

Various systems and methods have been employed for the payment and reporting of taxes to governmental agencies. For example, reference may be made to U.S. Statutory Invention Registration H1,830 and the following U.S. Pat. No. : 5,335,169 to Chong; U.S. Pat. No. 5,420,405 to Chasek; U.S. Pat. No. 5,799,283 to Francisco et al.; U.S. Pat. No. 5,875,433 to Francisco et al.; U.S. Pat. No. 6,078,898 to Davis et al.; and U.S. Pat. No. 6,078,899 to Francisco et al.

In particular, the '283 patent, the '433 patent and the '899 patent are directed to systems for automatically collecting and reporting taxes. The systems disclosed in these patents create reports on sales tax and provide means of reporting the tax to the state and federal government. These systems do not, however, address the distribution of taxes.

In addition to the payment and reporting of taxes, the collection of sales and use taxes is an important business requirement of retailers and merchants throughout the United States. In this regard, taxing authorities at the local, state and federal levels require both large and small businesses to collect a sales tax for each taxable item of goods they sell in the course of commerce.

To meet taxing authority requirements, currently a typical merchant and/or other entity must calculate the sales tax for each customer transaction, add the calculated sum to the invoice or bill subtotal presented to the customer for the goods sold, collect the sales tax from the customer with the purchase sum, deposit for safe keeping the collected taxes and finally remit and account for the collected taxes to the appropriate taxing authorities on a periodic basis, which is typically on a quarterly basis and/or other.

To compensate the merchant or retailer for the burden of acting as the agent for the taxing authority, the merchant is allowed to keep the periodic interest accrued on the collected tax dollars during each collection period.

While the above described method of collecting and remitting sales and use taxes has been effectively employed for many years, such a method is not cost effective and cumulatively costs the taxing authorities millions of dollars. In this regard, the taxing authority not only loses the accrued periodic interest known as "the float," but the authority also loses the use of the collected money until it is remitted by the merchants for the collection period. Moreover, since the taxing authority does not have the use of the collected money until it is remitted, the money is not available for use to pay the monetary obligations of the taxing authority. Thus, the taxing authority may be compelled to borrow money to meet its financial obligations. Furthermore, such a system places a heavy burden on merchants and taxing authorities alike since it requires manual implementation.

In U.S. Pat. No. 5,644,724, issued Jul. 1, 1997, there is disclosed a point-of-sale tax collection system and method of using same. The abstract of the '724 patent states that a "new and improved tax collection system and method collects and remits taxes in real time at point-of-sale locations. The system includes a group of point-of-sale terminals at merchant point-of-sale facilities that receive and store tax collection information under merchant control. A bank computer at a merchant bank accesses the stored tax collection information and wire transfers the collected sums periodically to at least one computer at a taxing authority such as a tax authority bank or other financial organization. For credit or debit transactions, a service computer receives the tax collection information daily or at other periods of time from certain ones of the point-of-sale terminals, and wire transfers the credited or debited taxes to the tax authority bank computer."

Such a patented system is highly desirable, effective and efficient for tax collection and distribution. It would be desirable to extend such a system to, for example, a nationwide or, perhaps, a worldwide, network of merchants. However, due to the fact there are numerous taxing authorities, such as federal, state and local governments, and/or other entities in the United States and internationally, each merchant would be required to communicate with the numerous taxing authorities each day or other regular period of time. This complexity can be disruptive and unwanted for some situations such as for small businesses.

Additionally, each taxing authority would be required to communicate with thousands of merchants across the nation on a regular basis in order to receive the tax revenues. Each taxing authority would be required to invest in sufficient resources in order to handle the demand of the collection system. This demand may be too burdensome for many taxing authorities.

Additional problems related to the collection of sales tax on a large-scale basis are created with the explosion of e-commerce transactions. One problem created by e-commerce is related to the determination of the proper taxing authority. For example, transactions on the Internet may involve a consumer in one state, a merchant's place of business in another state, warehousing in a third state, billing or processing in a fourth state, and a fulfillment center in a fifth state. Each of the five states involved may have different taxing rules. For example, a state may require tax on a transaction if the consumer is in that state, or the state may require tax if the merchant is in that state. Thus, a merchant may be required to distribute taxes to a large number of taxing authorities.

With the emergence of the Internet and the explosion in e-commerce transactions, the taxing authorities are bound to experience a sharp increase in the number of transactions in such a system. Such an increase would require each taxing authority to expand its ability to handle all of the anticipated transfers.

BRIEF DESCRIPTION OF THE DRAWINGS

The disclosed embodiments of the present invention provide a system and a method for the effective collection and distribution of sales taxes from check, debit, truncated check or other similar debit-type transactions without imposing an undue burden upon individual merchants or individual taxing authorities.

In the following, the invention will be explained in further detail with reference to the drawings, in which.

DESCRIPTION OF CERTAIN EMBODIMENTS OF THE INVENTION

The disclosed embodiments of the present invention provide a system and a method for collection and distribution of sales taxes for debit-type transactions on a frequent, regular basis, such as daily, weekly, monthly, quarterly, or other. The disclosed embodiments provide a system and a method for transferring funds from numerous merchant banks, financial accounts or other, to numerous taxing authorities banks, financial accounts or other, in an efficient manner, with each merchant seeking to transfer funds to perhaps several taxing authorities and each taxing authority seeking to receive funds from many merchants. An automated and centralized distribution feature utilizing available transactional infrastructure would allow the merchants banks, financial accounts or other, and the taxing authorities banks, financial accounts or other, to each communicate with a single or relatively few entities in transferring the funds. Therefore, efficient tax collection and distribution may be achieved without overburdening either individual merchants or individual taxing authorities.

As an example of an embodiment of the invention, FIGS. 1A, 2A, 3A, 4A and 4B illustrate a credit-card transaction that may be conducted between a consumer and a merchant. The processing of credit card transactions is discussed in *Developer's Guide to Integrating Electronic Payments* by Bill Pittman (Rich Solutions, Inc., 2001), which is hereby incorporated by reference it its entirety.

Figure 1A:
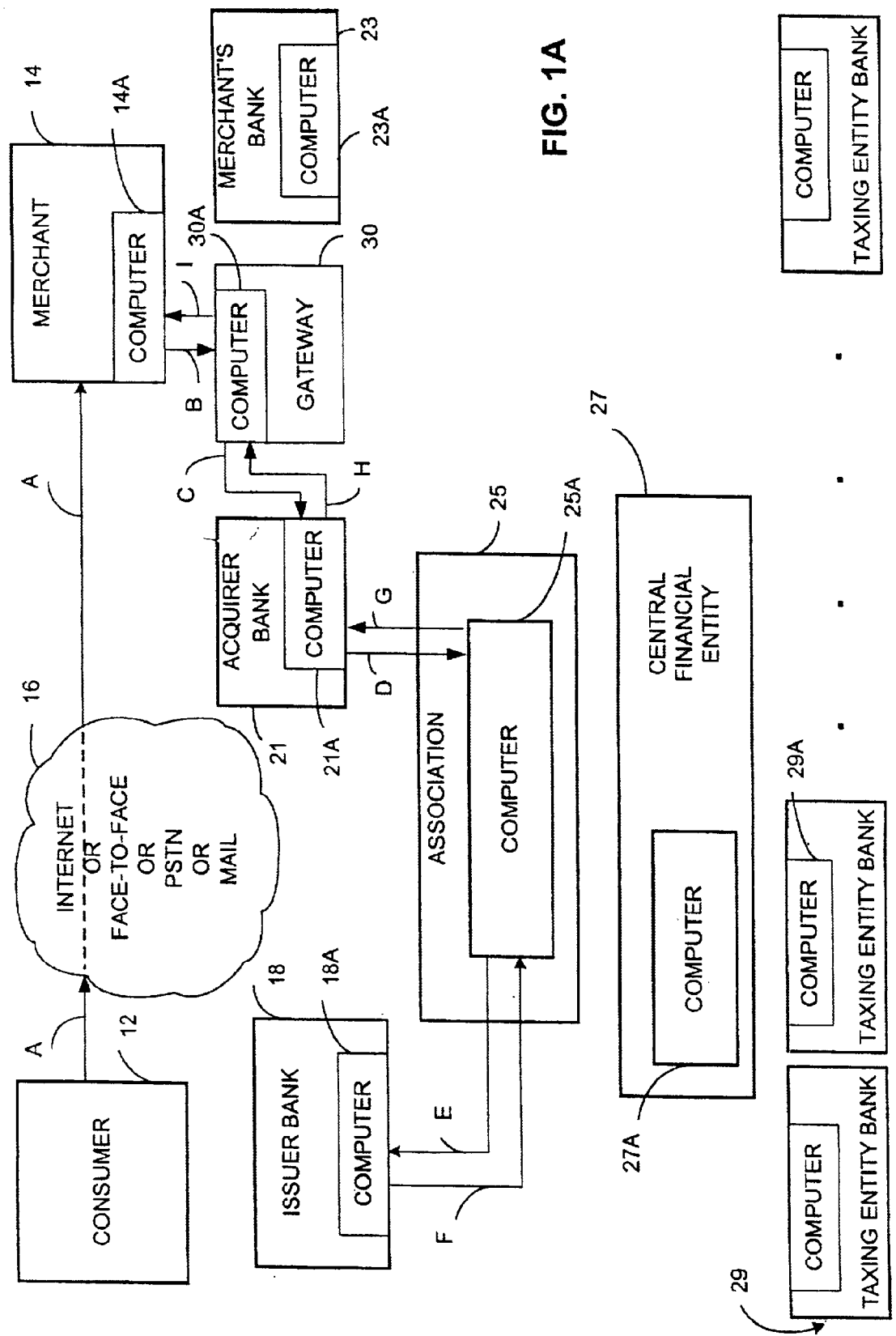
FIG. 1A is a pictorial illustration of a first part of a credit-card transaction between a single consumer and a merchant according to an embodiment of the invention.
Figure 4A:
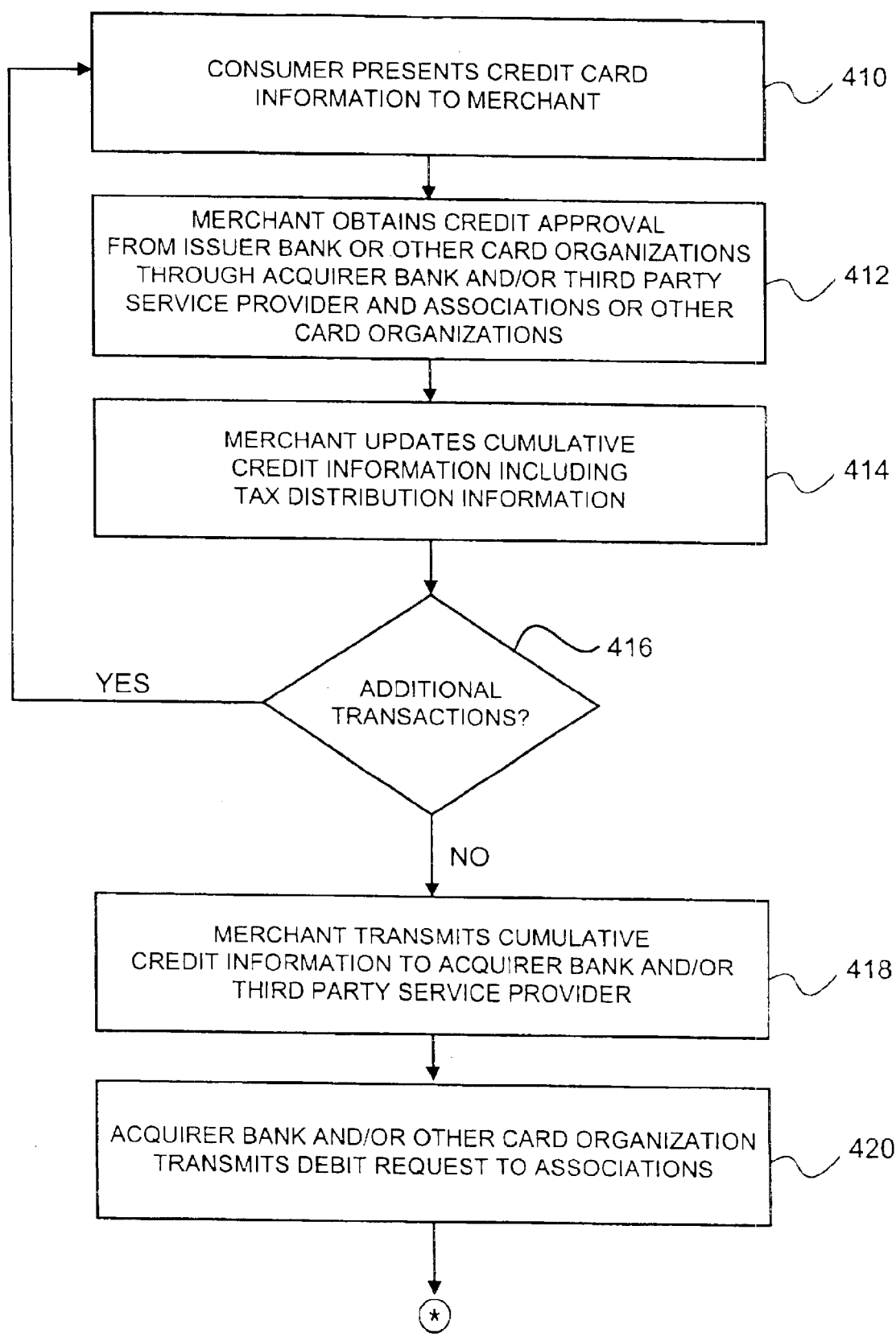
FIGS. 4A and 4B illustrate the processing of a credit-card transaction according to an embodiment of the present invention.

Referring first to FIGS. 1A and 4A, a consumer 12 may interact with a merchant 14 through an interaction means 16 such as a public and/or private, direct and/or indirect means of transaction communication, including, but not limited to a public switched telephone network (PSTN), the Internet, cable, T-1, fiber optic, satellite, cellular or other wireless, face-to-face, mail or other. The consumer 12 obtains a credit card from an issuer bank 18 and/or a service provider which supplies the consumer 12 with a credit line. The issuer bank 18 may be a bank or other card company such as travel and entertainment, petroleum or other. Similarly, the merchant 14 acquires credit-transaction capability through an acquirer bank and/or a service provider 21. The merchant 14 may interact with the acquirer bank and/or service provider 21 through a gateway 30 having a gateway computer 30A. Alternatively, the merchant 14 may interact directly with the acquirer bank and/or service provider 21. The merchant 14 may also have an account at a merchant's bank 23 for holding and transferring funds. The issuer bank 18 and the acquirer bank 21 may interact through credit card associations 25 such as Visa or MasterCard and/or other card organizations (CO). In some transactions, the issuer bank and the acquirer bank may be the same entity such as may be the case with private label cards, travel and entertainment cards, petroleum cards and others. In still other transactions, for certain types of credit cards, the card organization itself may function as either one or both of the issuer and acquirer, or other entity such as a clearinghouse (not shown). A central financial entity 27, such as the Federal Reserve Bank, a state bank, or another institution such as a processor, may be either a private entity or a government entity. The central financial entity 27 may be any institution qualified and capable of acting as a conduit for distribution of funds. The central financial entity computer 25A may be one or more computers, and the central financial entity may be one or more entities. A plurality of taxing entities requiring tax collection may be individual states, local municipalities, the federal government, or other taxing entities, each having various taxing rates and/or distribution rules. The plurality of taxing entity banks 29 having computers such as computer 29A may be capable of receiving fund transfers on behalf of the taxing entities.

As illustrated in FIGS. 1A and 4A, a credit card transaction begins with the consumer 12 presenting his or her credit card and/or information to the merchant 14 (line A in FIG. 1A and block 410 in FIG. 4A). Prior to completing the transaction, the merchant 14 may be required to obtain approval for the credit card transaction from the issuer bank 18. In FIG. 4A, this is indicated by block 412. In this regard, the merchant 14 uses a computer 14A and/or other payment terminal or payment device, to forward the transaction information to a computer 21A at its acquirer bank through a gateway computer 30A at a gateway (lines B and C in FIG. 1A). In other embodiments, the merchant 14 may transmit the information directly to the acquirer bank 21, bypassing the gateway 30.

Figure 1B:
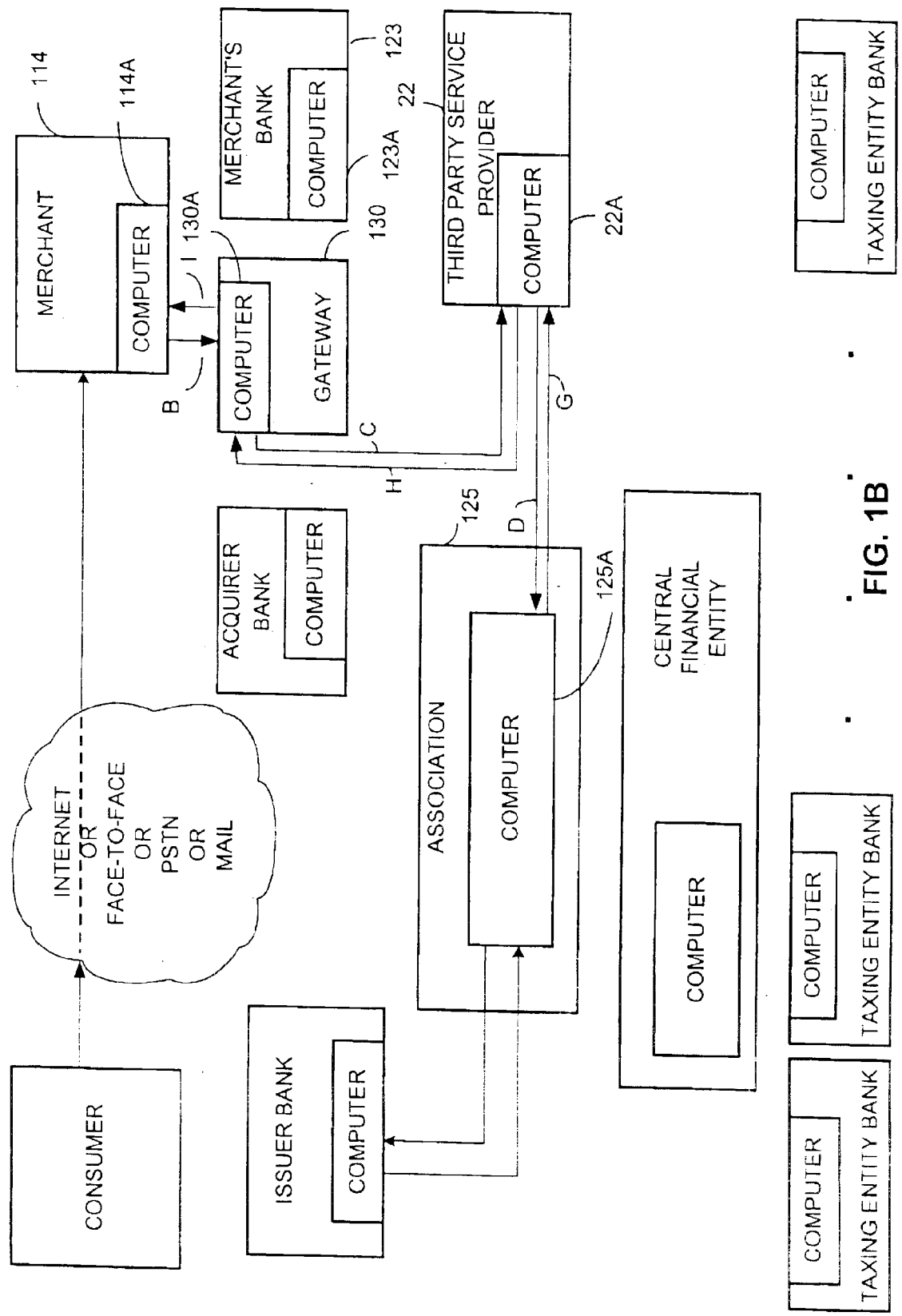
FIG. 1B is a pictorial illustration of a first part of a credit-card transaction between a single consumer and a merchant according to another embodiment of the invention.

In another embodiment, illustrated in FIG. 1B, a merchant 114 may forward the transaction information to a computer 22A at a third party service provider 22, such as a web-based provider or other. The information may be transmitted through a computer 130A at a gateway 130, as illustrated in FIG. 1B, lines B and C, or directly to the third-party service provider computer 22A.

For a conventional brick-and-mortar merchant location, the merchant 14 may have a computer with a magnetic strip reader for swiping a physical credit card, a point-of-sale electronic payment device or a conventional cash register and/or other payment device. For e-commerce or telephone transactions, the merchant 14 may have a host such as a server connected to a web link, a virtual terminal and/or other payment device.

Referring now to FIGS. 1A and 1B, the forwarded transaction information includes the transaction amount, including a portion for taxes. Thus, the merchant's computer 14A, 114A or the third-party service provider computer 22A of FIG. 1B or other, may determine the amount of tax to be collected from the consumer. This determination may be made by the merchant's computer 14A, 114A, the third-party service provider computer 22A or other based on knowledge of the location of the consumer 12, location of the merchant 14, the tax laws of the various taxing entities 29 and predetermined distribution rules. Distribution rules may be agreed upon by the various taxing entities 29. For example, the distribution rules may specify the distribution of taxes if the consumer 12 is in one state and the merchant 14 is in another. The rules may also take into account the locations of billing, warehouse or fulfillment centers. The location of the consumer 12 may be determined or sourced according to information provided by the consumer 12, such as a home ZIP+4 code. The ZIP+4 code may also be obtained from the consumer's credit card billing address, an AVS (address verification service), or other.

Such distribution rules may also be used to provide the additional advantage of preventing or remedying fraud. For example, distribution rules implemented on a merchant's computer may be used to collect back taxes owed by the merchant to one or more taxing entities.

Referring now to FIG. 1A, the acquirer bank computer 21A (FIG. 1A) or other forwards the credit-card and transaction information to a computer 25A at the appropriate credit-card association 25 (line D) and/or other CO, which forwards a request for approval to a computer 18A at the consumer's issuer bank 18 (line E).

Similarly, in the embodiment illustrated in FIG. 1B, the third party service provider computer 22A or other forwards the credit-card and transaction information to a computer 125A at the appropriate credit-card association 125 (line D) and/or other CO, which forwards a request for transaction approval to a computer at the consumer's issuer bank. In other embodiments, the request for approval of the transaction may be transmitted to an entity that is different than the issuer bank and/or other CO. For example, the approval process may be outsourced by the issuer bank to a third party.

Referring again to FIG. 1A, the association computer 25A may be one or more computers, and the central financial entity may be one or more entities. The issuer bank computer 18A and/or other CO may either approve or deny the request for credit and send a response to the association's computer 25A and/or other CO (line F).

In the embodiment illustrated in FIG. 1A, the response from the issuer bank computer 18A is forwarded via the association's computer 25A to the computer 21A at the acquirer bank 21 (line G), which then forwards the response to the merchant's computer 14A through the gateway computer 30A (lines H and I). Again, in other embodiments, the gateway 30 may be bypassed, and the response may be forwarded directly from the acquirer bank computer 21A to the merchant's computer 14A.

Similarly, in the embodiment illustrated in FIG. 1B, the response from the issuer bank computer is forwarded by the association's computer 125A to the third party service provider computer 22A (line G). The third party service provider computer 22A may then forward the response to the merchant's computer 114A through the gateway computer 130A (lines H and I), or may bypass the gateway 130 and transmit the response directly to the merchant's computer 114A.

Referring again to FIG. 1A, if the issuer bank computer 18A authorizes the request for approval, the merchant's computer 14A obtains the approval, and the transaction is ready to proceed to a settlement phase. In this phase, illustrated in FIG. 2A, the actual transfer of credit occurs through a path similar to that described above with reference to FIG. 1A. The merchant 14 uses his computer 14A to forward, through the gateway computer 30A, the credit-card and transaction information, including the total sales amount, to the computer 21A at its acquirer bank 21 (lines J and K). Again, the gateway 30 may be bypassed in other embodiments.

Figure 2A:
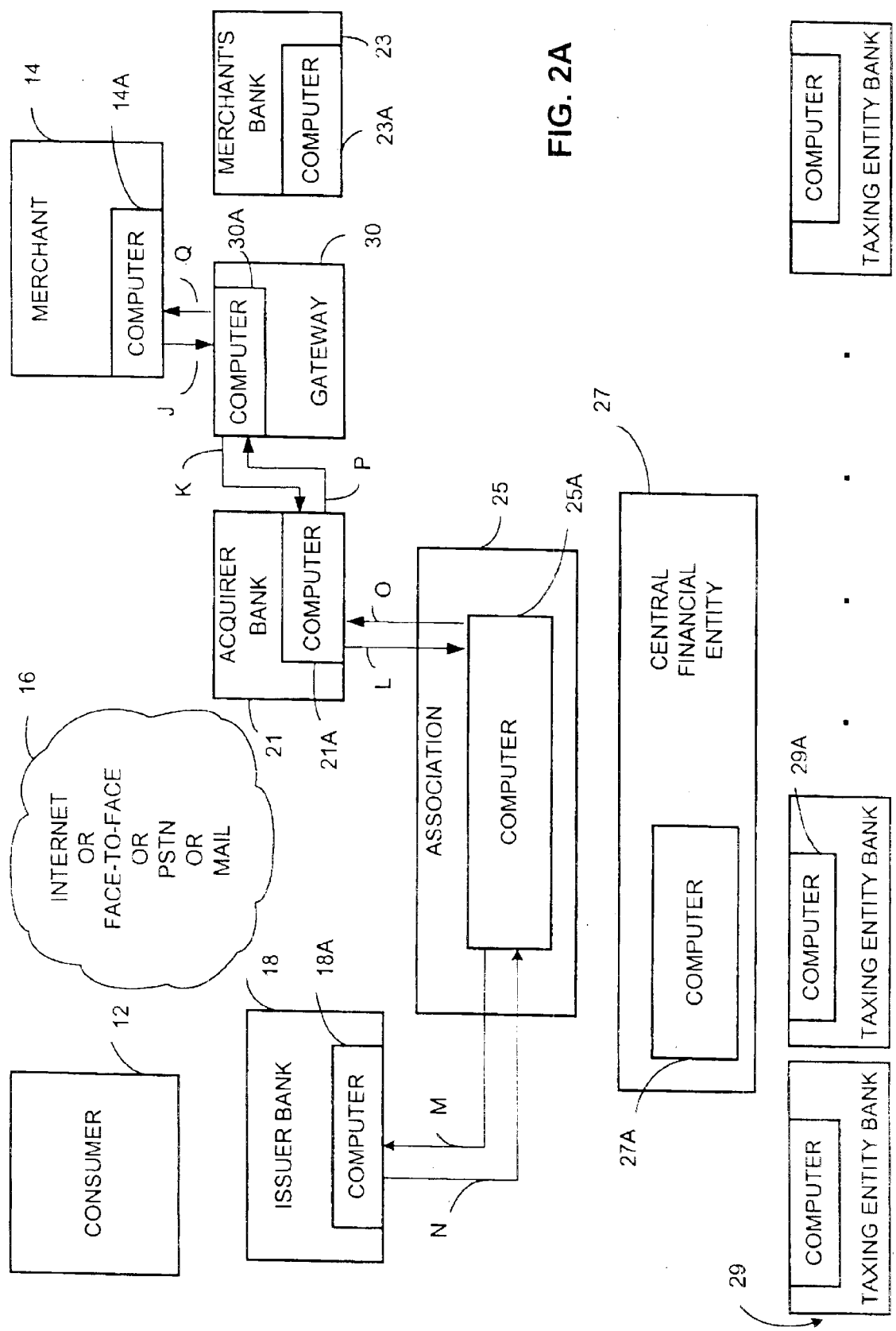
FIG. 2A is a pictorial illustration of a second part of the credit-card transaction of FIG. 1A.
Figure 2B:
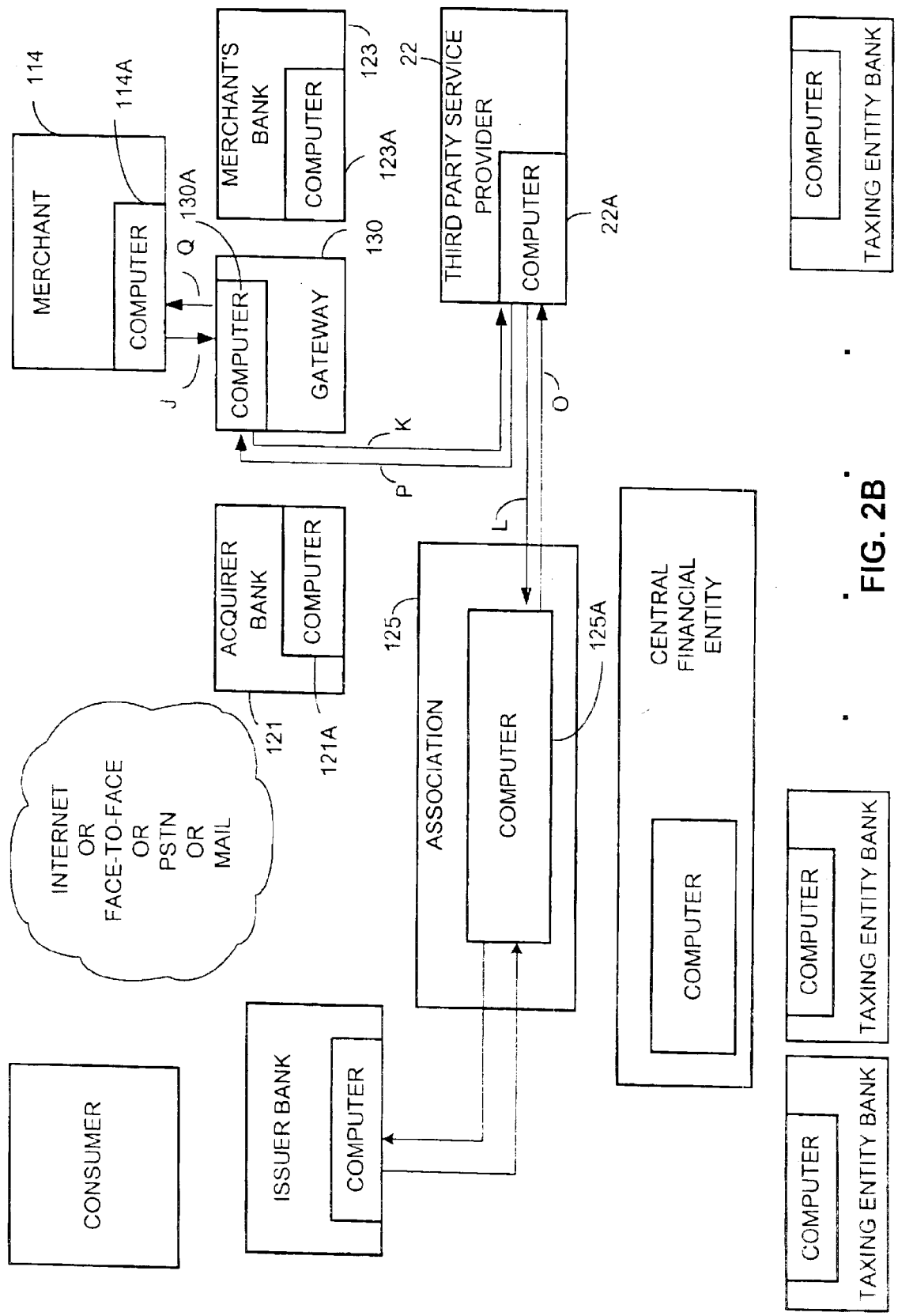
FIG. 2B is a pictorial illustration of a second part of the credit-card transaction of FIG. 1B.

For the embodiment illustrated in FIG. 1B, the settlement phase is illustrated in FIG. 2B. The merchant 114 may transmit the credit-card and transaction information from his computer 114A to the computer 22A at the third party service provider 22 through the gateway computer 130A (lines J and K). Alternatively, the gateway 130 may be bypassed, and the information may be transmitted directly from the merchant's computer 114A to the third-party service provider computer 22A.

In many instances, the total sales amount may be different from the amount approved in the first phase. For example, in the case of restaurants and/or other establishments where a gratuity would be used (e.g., taxi, hair salon, delivery, bar, or other), the approved amount may include the sale amount plus an allowance for a gratuity. Once the consumer adds the tip to the sale amount, the total sales amount is transmitted to the acquirer bank 21 (FIG. 2A), the third party service provider 22 (FIG. 2B) or other. The acquirer bank computer 21A (FIG. 2A) or the third party service provider computer 22A (FIG. 2B) forwards the credit card and transaction information to the computer 25A at the appropriate credit-card association 25, 125 and/or other card organization (line L).

Referring again to FIG. 2A, the computer 25A at the credit card association 25 forwards the credit-card and transaction information to the computer 18A at the issuer bank 18 (line M). Again, a separate entity may be used to perform this function of the issuer bank 18. The issuer bank computer 18A may then return a transaction confirmation code such as confirmation, approval or authorization or declined or other to the merchant's computer 14A via the association 25 and/or other card organization, the acquirer bank 21 and the gateway 30 (lines N, O, P and Q). Again, the use of the gateway 30 may be bypassed in other embodiments.

In the embodiment illustrated in FIG. 2B, the response from the issuer bank computer may be returned to the merchant's computer 114A via the association 125, the third-party service provider 22 and the gateway 130, which may be bypassed in other embodiments.

Referring again to FIG. 2A, during the transaction, such as at its completion, the merchant's computer 14A may calculate the sales tax owed to each taxing entity 29 and append that calculation to a database (not shown) within the merchant's computer 14A or other, as well as appending an accounting of the credit card proceeds to be collected (block 414 of FIG. 4A). In other embodiments, the tax calculation database or service may be located on a separate computer, such as one belonging to a third party service provider or other such as a clearinghouse.

Figure 3A:
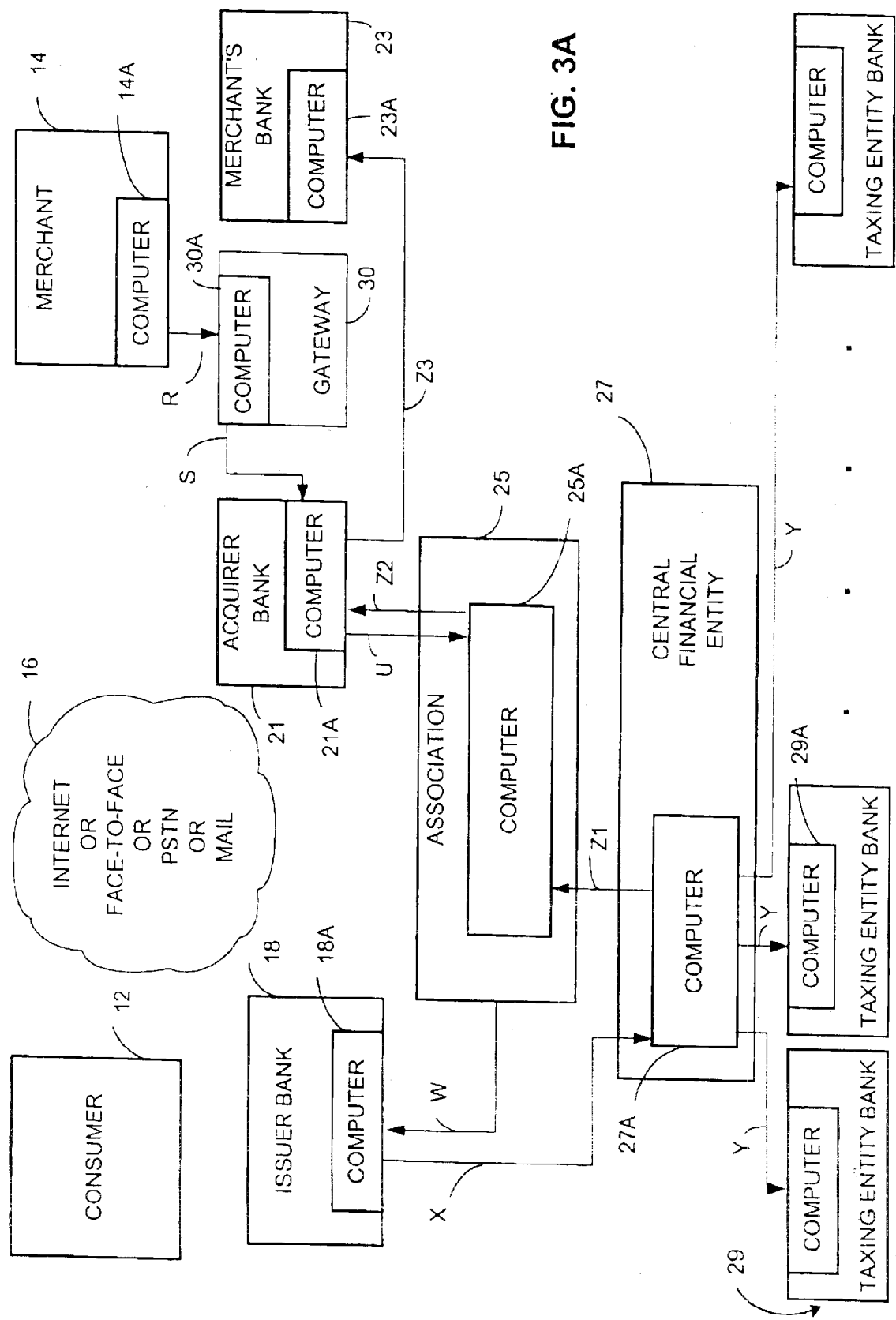
FIG. 3A is a pictorial illustration of a third part of the credit-card transaction of FIG. 1A.
Figure 4B:
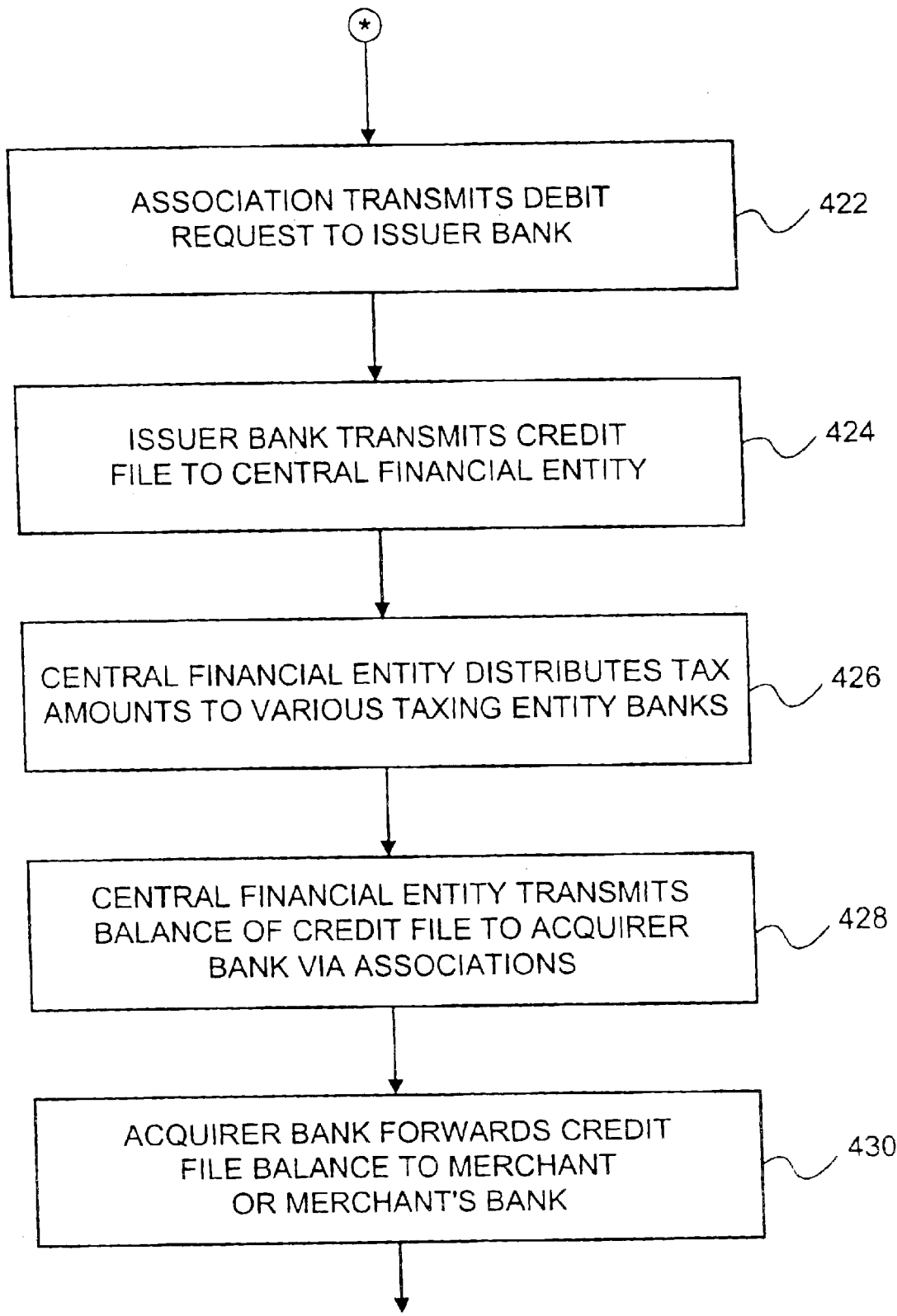

Referring now to FIGS. 3A, 4A and 4B, the merchant's computer 14A may periodically transmit information relating to all credit-card transactions during a period to the computer 21A at its acquirer bank 21 for collection of funds. In this regard, the merchant's computer 14A may determine, through either an internal clock or through manual input from a user, whether additional transactions are to be conducted in the period (block 416 in FIG. 4A). This operation may be performed as part of a conventional batching operation, or done separately. The merchant's computer may transmit the required information ultimately to the computer 21A at the acquirer bank 21 or other through a gateway computer 30A (lines R and S in FIG. 3A, block 418 in FIG. 4A). For example, at the end of a day, shift, period or other, the merchant's computer 14A may transmit the individual or cumulative transaction information for that day, shift, period or other to a third party service provider or clearinghouse, and then to the acquirer bank, merchant's bank or other. In other embodiments, the gateway 30 may be bypassed. The information includes data relating to distribution of taxes to each taxing entity bank 29 or financial account entity. For example, along with the total amount of funds to be collected from the various issuer banks 18, the information may include the portion of those funds accounting for the merchant's revenue and the portion accounting for the taxes, as well as the taxing entity(ies) to which those taxes are to be disbursed.

The acquirer bank's computer 21A then forwards a debit request, such as a settlement request or other, to the computer 25A at the appropriate credit-card association 25 and/or other COs (line U in FIG. 3A, block 420 in FIG. 4A).

The central financial entity's computer 27A may then forward the debit request to the issuer bank's computer 18A (line W in FIG. 3A, block 422 in FIG. 4B), which responds with the transmission of a credit file to the central financial entity's computer 27A (line X in FIG. 3A, block 424 in FIG. 4B). The issuer bank's role as a credit entity may be performed by a separate entity. For example, the issuer bank 18 may outsource this function to a third party. Tax-related data may be tagged, such as flagged or otherwise identified, to the request at each stage.

It is understood that the computer 27A at the central financial entity 27, as well as the various other illustrated computers, may be a group of computers disposed in different locations. They may, of course, include various different servers in a networked system such as an Internet-based system.

Alternatively, the information from the merchants' computer 14A may only include raw data relating to the transactions, including the monetary amount of transactions involving each taxing entity 29. In this instance, the central financial entity's computer 27A, for example, may determine the required distributions to the various taxing entities 29 based on the provided information, knowledge of the tax laws of the various taxing entities 29 and/or predetermined distribution rules, such as those discussed in paragraph 41. In a further embodiment, an external service entity (not shown) may perform the determination of the distributions and may pass that information to the computer 27A at the central financial entity 27.

The central financial entity's computer 27A may then distribute the tax amounts to the various taxing entities banks 29, financial account entity or other according to the information provided by a third party service computer, or the merchant's computer 14A (lines Y in FIG. 3A, block 426 in FIG. 4B) or other computer or server. In this regard, the central financial entity's computer 27A may transmit signals to computers at the various taxing entities banks 29, financial account entities or other, such as computer 29A. The signals transmitted to the computers 29A at the taxing entity banks 29 may also include merchant tax reporting information. The central financial entity's computer 27A then transmits the balance of the credit file to a computer 25A at the appropriate credit-card association 25 and/or other card organization (line Z1 in FIG. 3A, block 428 in FIG. 4B). It is understood that the fund transfer may be transferred to a bank (not shown) on behalf of the association 25 and/or other card organization.

The credit-card association's computer 25A may subtract a fee for its services from the credit file. The charge may be a percentage of the funds processed by the association 25 and/or other card organization, or a transaction fee or other. In this regard, the present invention may offer the additional advantage of lowering the cost to the merchant 14 of conducting credit card transactions. Since the tax portion of the fund transfer may be removed prior to receipt of the funds by the association 25 and/or other card organization, the merchant 14 may not be required to pay a fee for processing of that tax portion of the transaction. However, the funds may include tax amount as done today, thereby providing additional percentage fees to the associations and other card organizations.

The credit card association's computer 25A and/or other card organizations then forwards the balance of the funds to the acquiring bank's computer 21A (line Z2 in FIG. 3A, block 428 in FIG. 4B). The acquiring bank's computer 21A may then forward the funds either directly to a merchant's specified account or, as illustrated in FIG. 3A by line Z3, to a computer 23A at the merchant's bank 23 (block 430 in FIG. 4B). Thus, taxes collected through all credit-card and/or other transactions may be distributed to the taxing entities bank 29 or financial account entities through, for example, a central financial entity 27.

In other embodiments of the invention, other entities may be used as a distribution point for the taxing entities 29. For example, the computers 25A at various credit associations, third party service providers and or other CO 25 may serve as the distributing entities. Alternatively, each acquirer bank 21 or issuer bank 18 may perform this function. (Not shown in FIG. 3A).

Figure 3B:
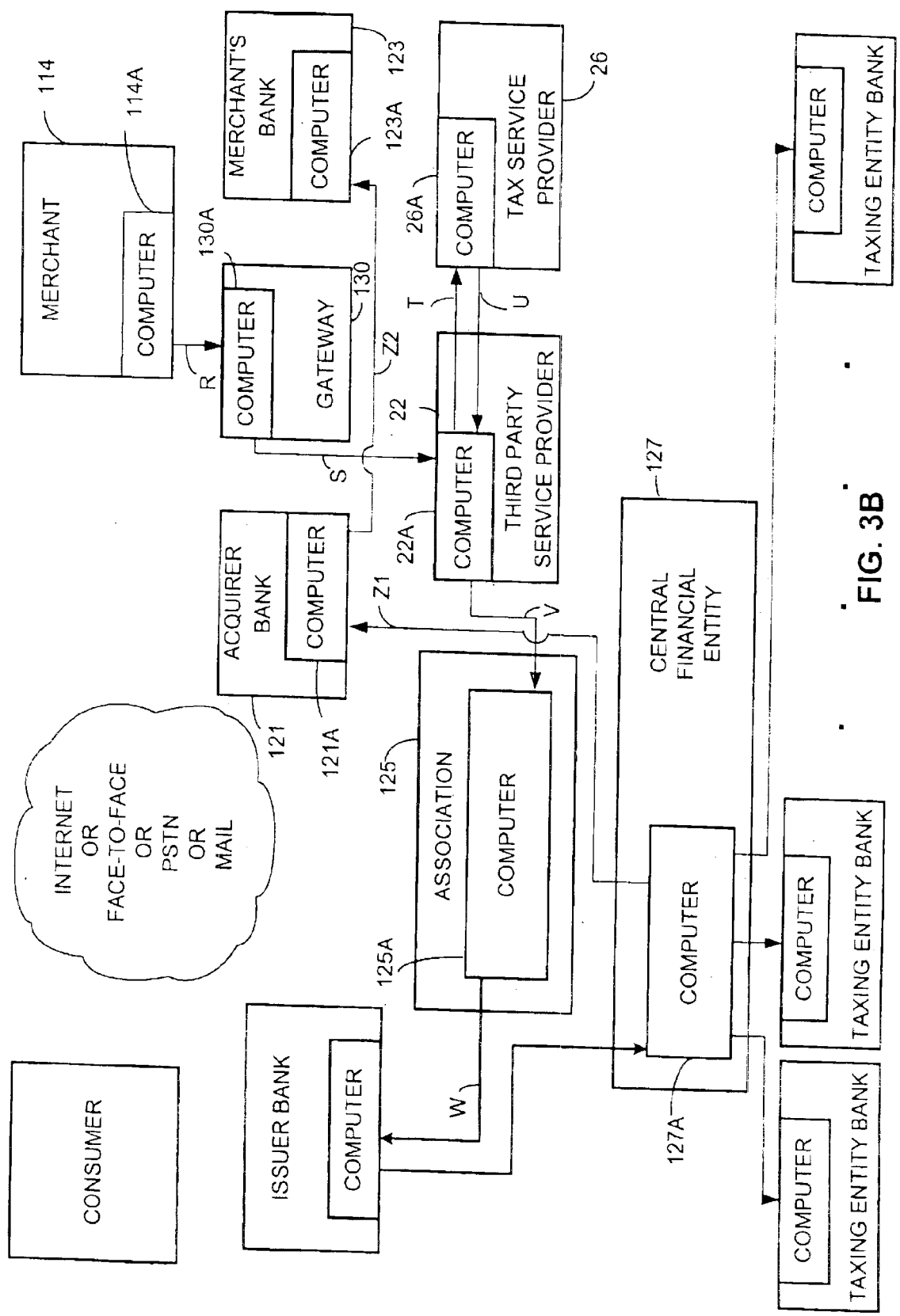
FIG. 3B is a pictorial illustration of a third part of the credit-card transaction of FIG. 1B.
Figure 3C:
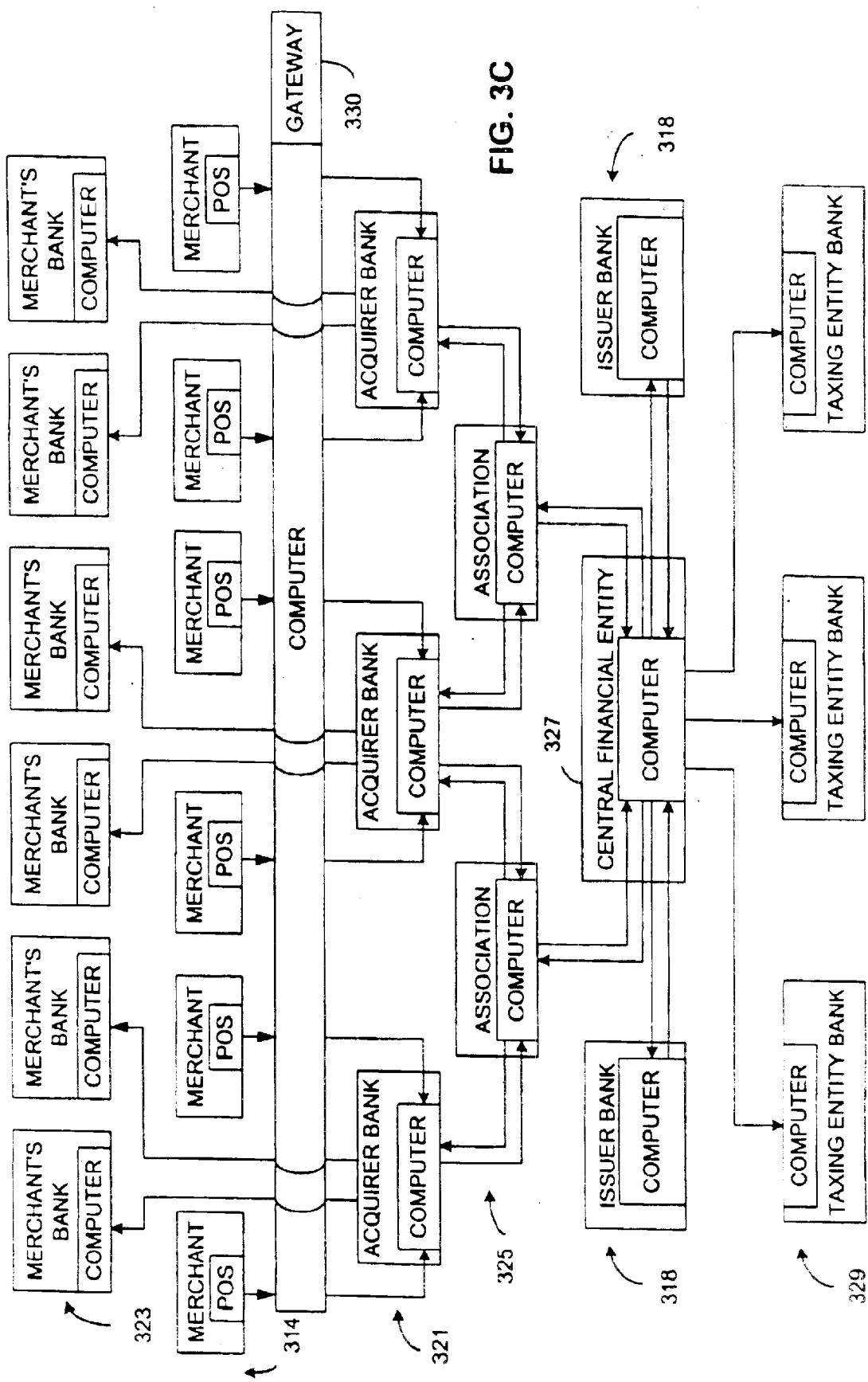
FIG. 3C is a pictorial illustration of the third part of the transaction illustrated in FIG. 3A for a plurality of merchants.
Figure 3D:
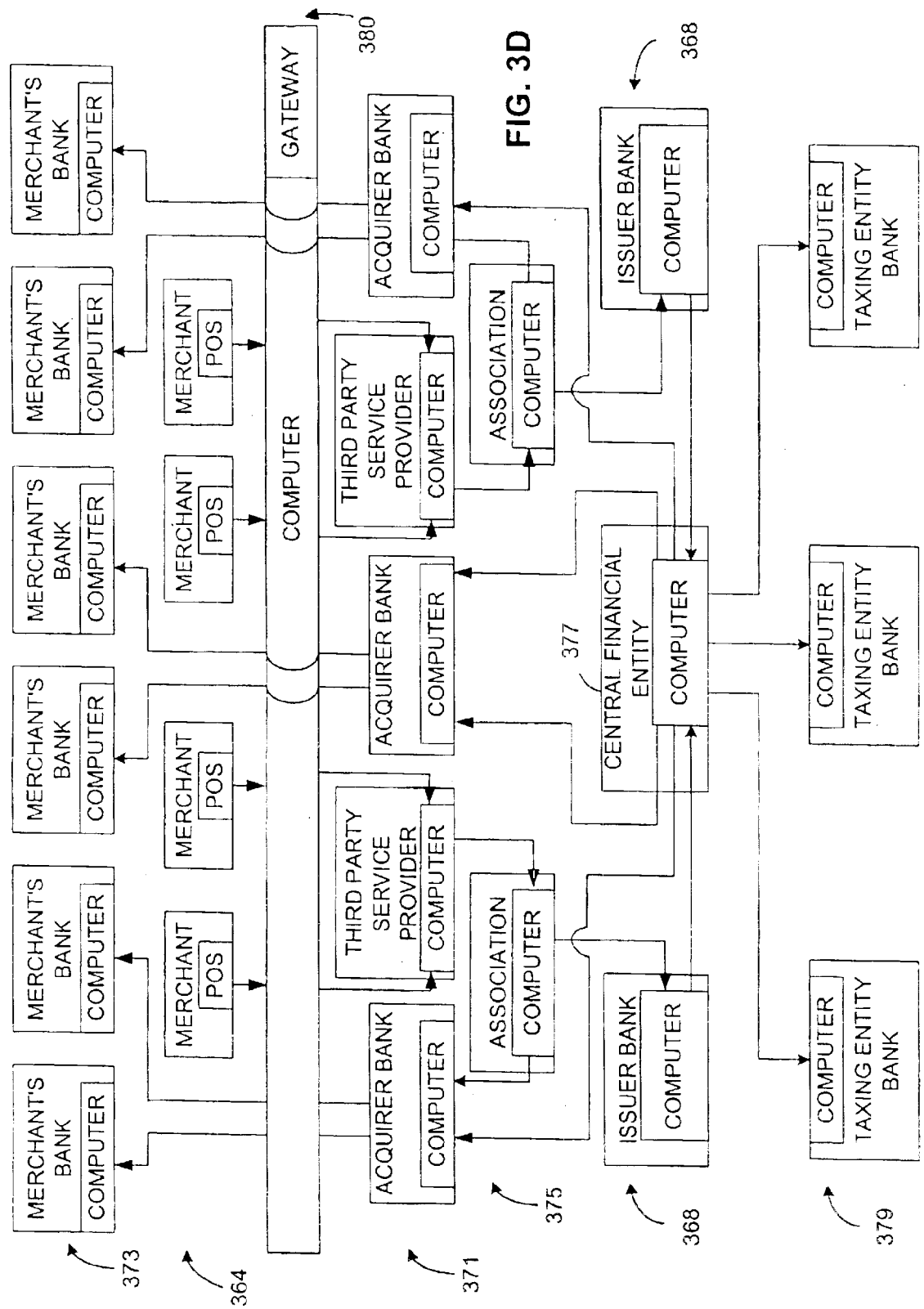
FIG. 3D is a pictorial illustration of the third part of the transaction illustrated in FIG. 3B for a plurality of merchants.
Figure 3E:
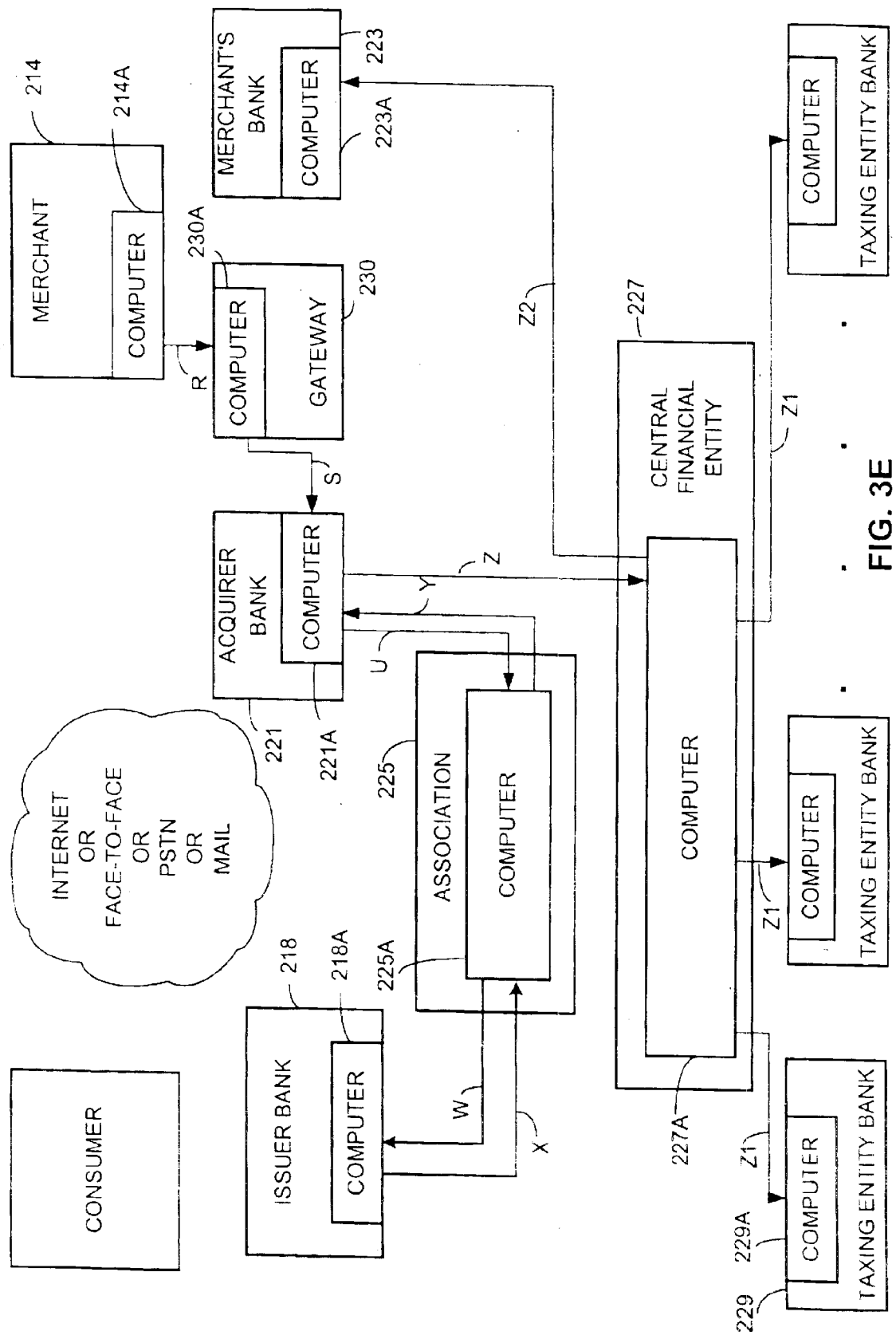
FIG. 3E is a pictorial illustration of another embodiment of the third part of the credit-card transaction of FIG. 1A.

In yet another embodiment, as illustrated in FIG. 3E, a fund transfer in response to a debit request may be transmitted from a computer 218A at the issuer bank 218 to a computer 225A at the credit-card association 225 or other CO (line X in FIG. 3E), which may deduct its service fee prior to forwarding the balance to a computer 221A at the acquirer bank 221 (line Y in FIG. 3E). The acquirer bank, after possibly deducting a service fee, forwards the funds to a computer 227A at a central financial entity 227 along with tax distribution information (line Z in FIG. 3E). The central financial entity computer 227A may use the tax distribution information to forward a tax component of the funds to each of a plurality of taxing entity banks 229 or financial account entities, each having a computer such as computer 229A (line Z1 in FIG. 3E). The central financial entity computer 227A may then forward the remaining balance to a computer 223A at a merchant's bank 223 (line Z2 in FIG. 3E).

For the embodiment illustrated in FIGS. 1B and 2B and described above, this phase is illustrated in FIG. 3B. In this embodiment, the merchant's computer 114A, at a time determined as described above with reference to FIG. 3A, may transmit the required information through the gateway computer 130A (which may be bypassed in other embodiments) to the third-party service provider computer 22A or other (lines R and S in FIG. 3B). The third-party service provider computer 22A may forward the information to a computer 26A at a tax service provider 26 (line T) for determination of the allocation of the tax funds to the appropriate taxing entities. The tax service provider computer 26A then returns the information, including tax distribution information, to the third-party service provider computer 22A (line U). In other embodiments, the tax allocation may have been determined on a transaction-by-transaction basis, thus eliminating the need for the determination by the tax service provider 26. In other embodiments, the information may be transmitted directly from the merchant's computer 114A to the tax service provider computer 26A, bypassing either one or both of the gateway computer 130A and the third-party service provider computer 22A. In further embodiments, the third-party service provider 22 and the tax service provider 26 may be a single entity, and the third-party service provider computer 22A and the tax service provider computer 26A may be a single unit. The third-party service provider computer 22A then forwards a debit request, such as a settlement request or other, to the computers 125A at the appropriate credit-card associations 125 and/or other COs (line V). In some embodiments, as illustrated in FIG. 3B, the associations 125 may transmit the debit request directly to the issuer banks (line W in FIG. 3B). In further embodiments, as also illustrated in FIG. 3B, the central financial entity 127 may receive a fund transfer from the issuer bank, bypass the associations and transfer the balance of the funds directly to the acquirer bank computer 121A (line Z1 in FIG. 3B). In this regard, the fees due to the associations may be determined and paid separately.

For sake of simplicity, FIGS. 1A, 2A and 3A illustrate a single transaction involving a single merchant. As illustrated in FIG. 3C, however, a system according to the invention may be implemented with a plurality of merchants. FIG. 3C illustrates the portion of the transaction illustrated in FIG. 3A, but with a plurality of merchants 314, a plurality of merchants' banks 323, a plurality of acquirer banks 321, a plurality of associations 325 and/or other card organizations and a plurality of issuer banks 318. A single central financial entity 327, such as the Federal Reserve Bank or a small group of entities such as issuers, acquirers or other qualified banks or entities, may be used to distribute taxes to a plurality of taxing entity banks or financial account entities 329.

Similarly, the embodiment illustrated in FIGS. 1B, 2B and 3B may also be implemented with a plurality of merchants. FIG. 3D illustrates the portion of the transaction illustrated in FIG. 3B, but with a plurality of merchants 364, a plurality of merchants' banks 373, a plurality of acquirer banks 371, a plurality of third-party service providers 371, a plurality of associations 375 and/or other card organizations and a plurality of issuer banks 368. A single central financial entity 377 may be used to distribute taxes to a plurality of taxing entity banks or financial account entities 379.

It is understood that the functions performed by any entity illustrated in the figures may be divided among two or more entities. Similarly, functions performed by two or more illustrated entities may be performed by a single entity.

Thus, in a system according to an embodiment of the invention, the tax proceeds are distributed to the taxing entities' banks 29 or financial account entities in a centralized manner from numerous merchants and including a plurality of acquirer banks, issuer banks and merchant's banks. Accordingly, the taxing entities banks 29 or financial account entities each receive their funds from either a single source or relatively few sources, rather than the thousands of merchants throughout their jurisdiction. Further, the tax funds may not be transmitted to each individual merchant bank or financial account entity 14; rather, they may be directed to the taxing entity banks 29 or financial account entities prior to the transmittal of funds to the merchant bank or financial account entity 14. However, it will become apparent to those skilled in the art that the merchant may receive the tax funds prior to their transmission to the taxing authority. Accordingly, there is little or no opportunity for a merchant to withhold some of the funds for himself. Additionally, the taxing entities are provided with the funds quicker without reliance on fast action by the merchants.

Figure 5A:
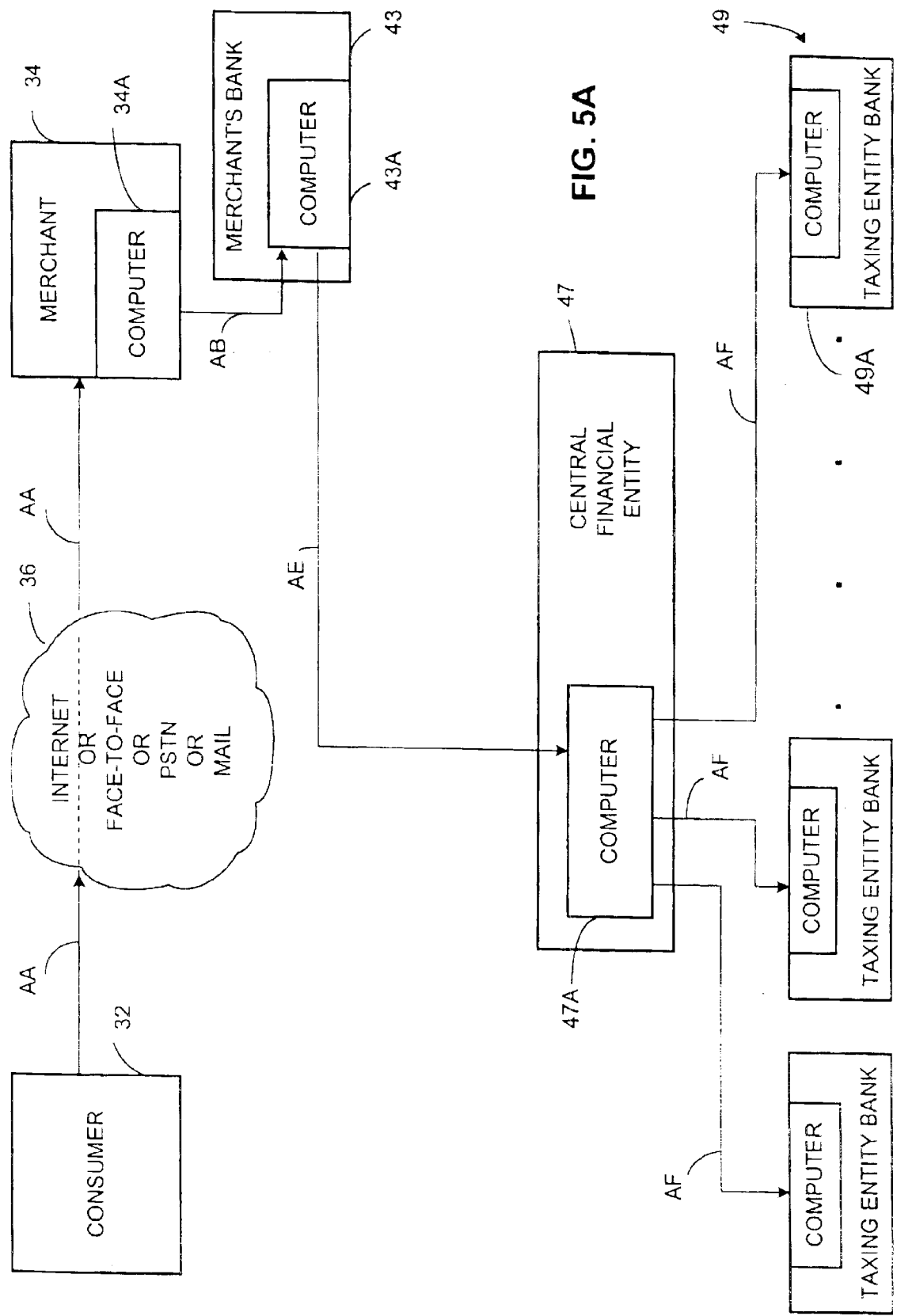
FIG. 5A is a pictorial illustration of a cash or cash-substitute transaction between a consumer and a merchant according to an embodiment of the invention.
Figure 6:
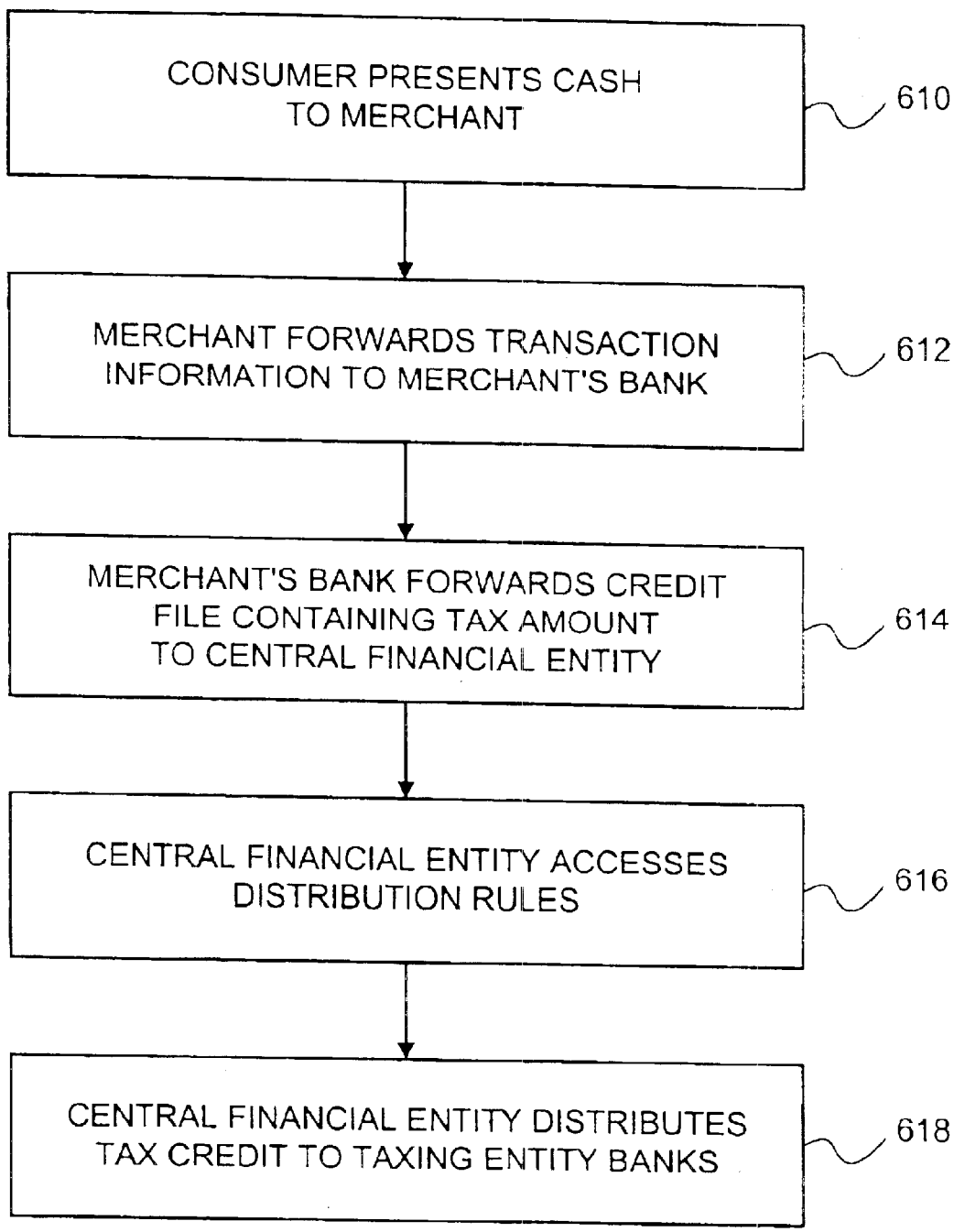
FIG. 6 is a flowchart illustrating the processing of a cash or cash-substitute transaction according to an embodiment of the invention.

FIGS. 5A and 6 illustrate the distribution of taxes according to another embodiment of the invention. FIGS. 5A and 6 relate to the distribution of taxes when the transaction involves either cash or cash-substitutes. As noted above, cash-substitutes may include check cards, smart cards, debit cards, electronic wallets installed on the computers of consumers as well as other methods of payment such as check guarantees, check truncations or check conversions, or other financial transaction methods, devices, or techniques. As with the transactions described above with reference to FIGS. 1A and 4B, transactions involving cash or cash-substitutes may also be conducted through interaction means 36. In this embodiment, as illustrated in FIGS. 5A and 6, a consumer 32 presents cash or cash substitute to a merchant 34 to complete a transaction (line AA in FIG. 5A, block 610 in FIG. 6). The transaction information may be supplied to a merchant's computer 34A. Periodically, the merchant's computer 34A may forward cash transaction information to a computer 41A at a merchant's bank 43 or other (line AB in FIG. 5A, block 612 in FIG. 6). The merchant's bank's computer 43A or other may then forward the cumulative cash transaction information and a credit data file to a computer 47A at a central financial entity 47 (line AE in FIG. 5A, block 614 in FIG. 6). The information may include the tax amounts due to each of a plurality of taxing entity banks 49 or financial account entities, as calculated by the merchant's computer 34A or certified service provider or other. Alternatively, the cash and cash substitute transaction information may contain only information relating to the various transactions. In this case, the central financial entity computer 47A or a service provider, for example, may calculate the individual or cumulative transactions distribution of the taxes to the various taxing entity banks 49 or financial account entities, as indicated by block 616 in FIG. 6. In this regard, the calculation of the distribution may also be performed by another intermediate entity.

In another embodiment, the merchant's computer 34A may forward the information directly to the central financial entity's computer 47A.

Figure 5B:
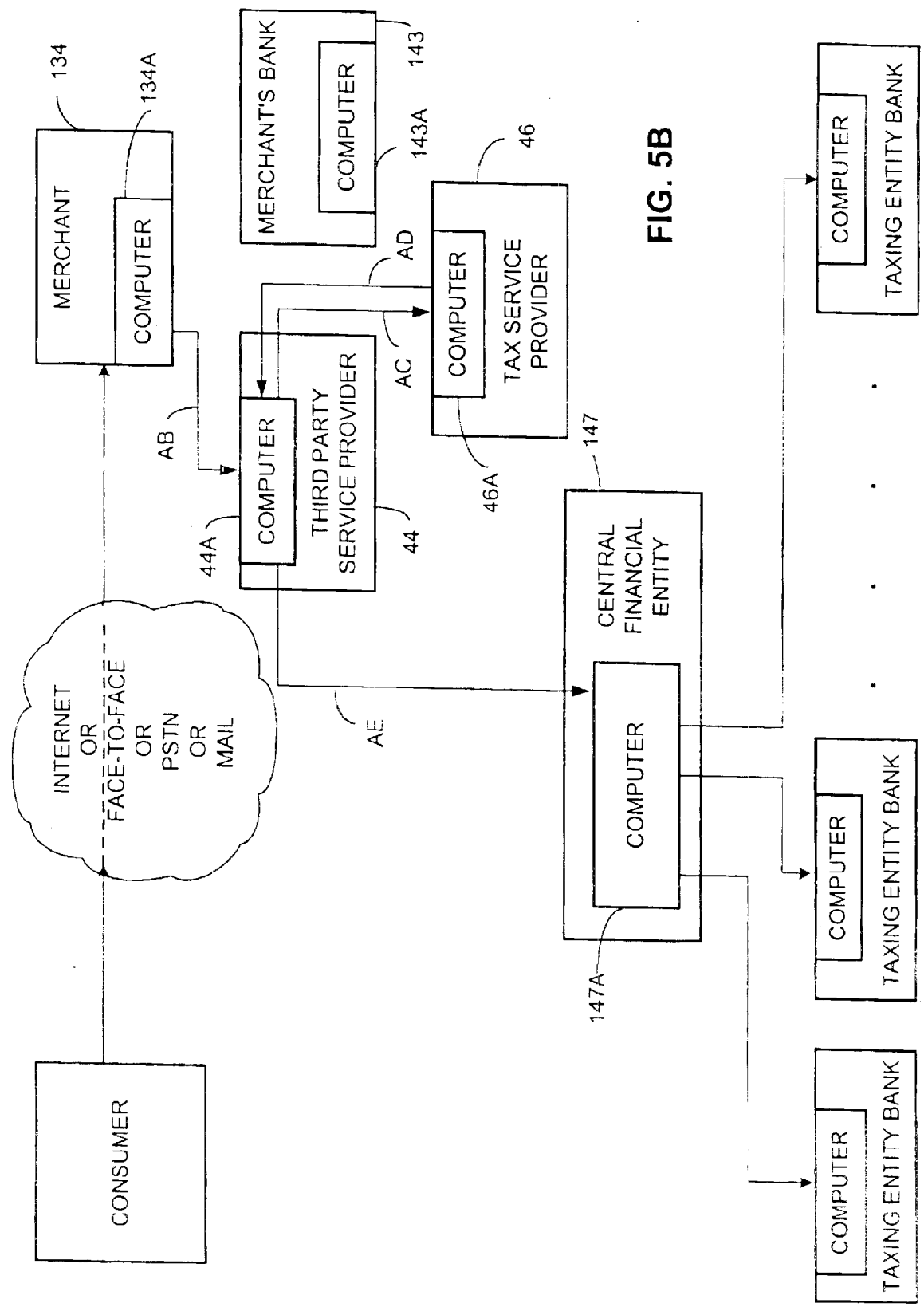
FIG. 5B is a pictorial illustration of a cash or cash-substitute transaction between a consumer and a merchant according to another embodiment of the invention.

In other embodiments, as illustrated in FIG. 5B, a merchant 134 may use a computer 134A to transmit the transaction information to a computer 44A at a third-party service provider 44 (line AB in FIG. 5B). The third-party service provider computer 44A may forward the information to a computer 46A at a tax service provider 46 (line AC) for determination of tax allocation. The tax service provider computer 46A may then return the information, including the tax allocation information, to the third-party service provider computer 44A (line AD) for transmission to a computer 147A at a central financial entity 147 (line AE). In other embodiments, the merchant's computer 134A may transmit the information to the third-party service provider 44A through a gateway computer (not shown). In further embodiments, the merchant's computer 134A may bypass the third-party service provider and transmit the information directly to the tax service provider computer 46A. In still further embodiments, the third party service provider 44 and the tax service provider 46 may be a single entity, and the third party service provider computer 44A and the tax service provider computer 46A may be a single unit.

Referring again to FIG. 5A, the credit data file forwarded to the central financial entity's computer 47A provides the information and funds for distribution to the taxing entity banks 49. Thus, the central financial entity's computer 47A is able to transmit the distributions to the taxing entity banks 49 according to the calculations made either by the central financial entity's computer 47A, the merchant's computer 43A, a third party service provider (not shown) or other. The distribution may be accomplished by transmitting a message, including a fund transfer, from the central financial entity's computer 47A to a computer 49A at each taxing entity bank or financial account entity 49 (line AF in FIG. 5A, block 618 in FIG. 6).

The distribution function performed by the central financial entity 47 in the above example may alternatively be performed by another entity. It is understood that the central financial entity 47 may be any institution or entity qualified and capable of serving as a conduit for the transfer of funds to the various taxing entities 49 bank or financial account entity.

Figure 5C:
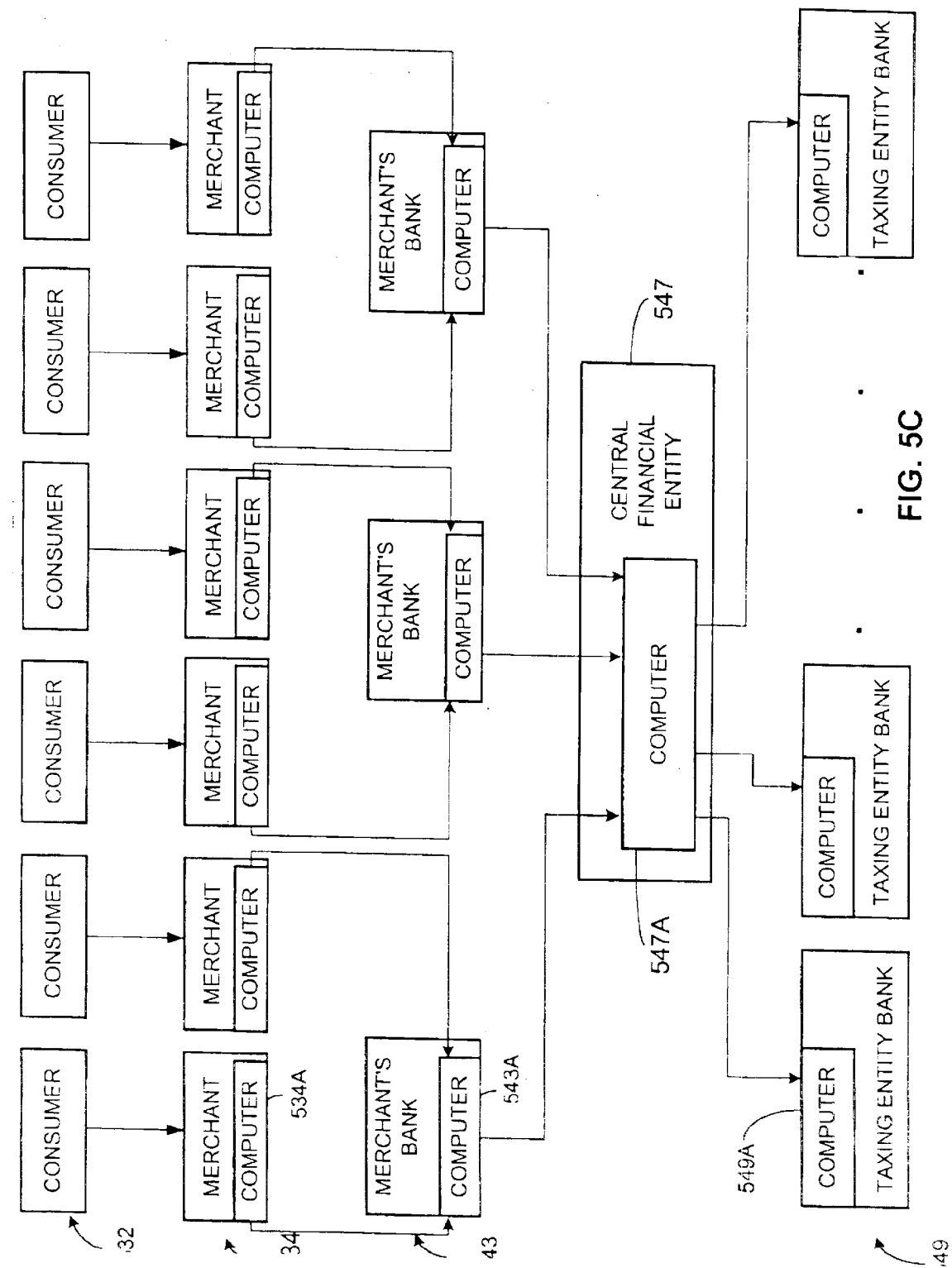
FIG. 5C is a pictorial illustration of the system of FIG. 5A with a plurality of merchants.

For sake of simplicity, FIGS. 5A and 6 illustrate a single transaction involving a single merchant. As illustrated in FIG. 5C, however, a system according to the invention may be implemented with a plurality of merchants 534, each having a computer such as computer 534A. FIG. 5C illustrates each of the merchants 534 transacting with consumers 532. FIG. 5C further illustrates the system with a plurality of merchant's banks 543, each having a computer such as computer 543A. A single central financial entity 547 may be used to distribute taxes from the plurality of merchants 534 to the plurality of taxing entity banks 549 or financial account entities, each having a computer such as computer 549A.

Figure 5D:
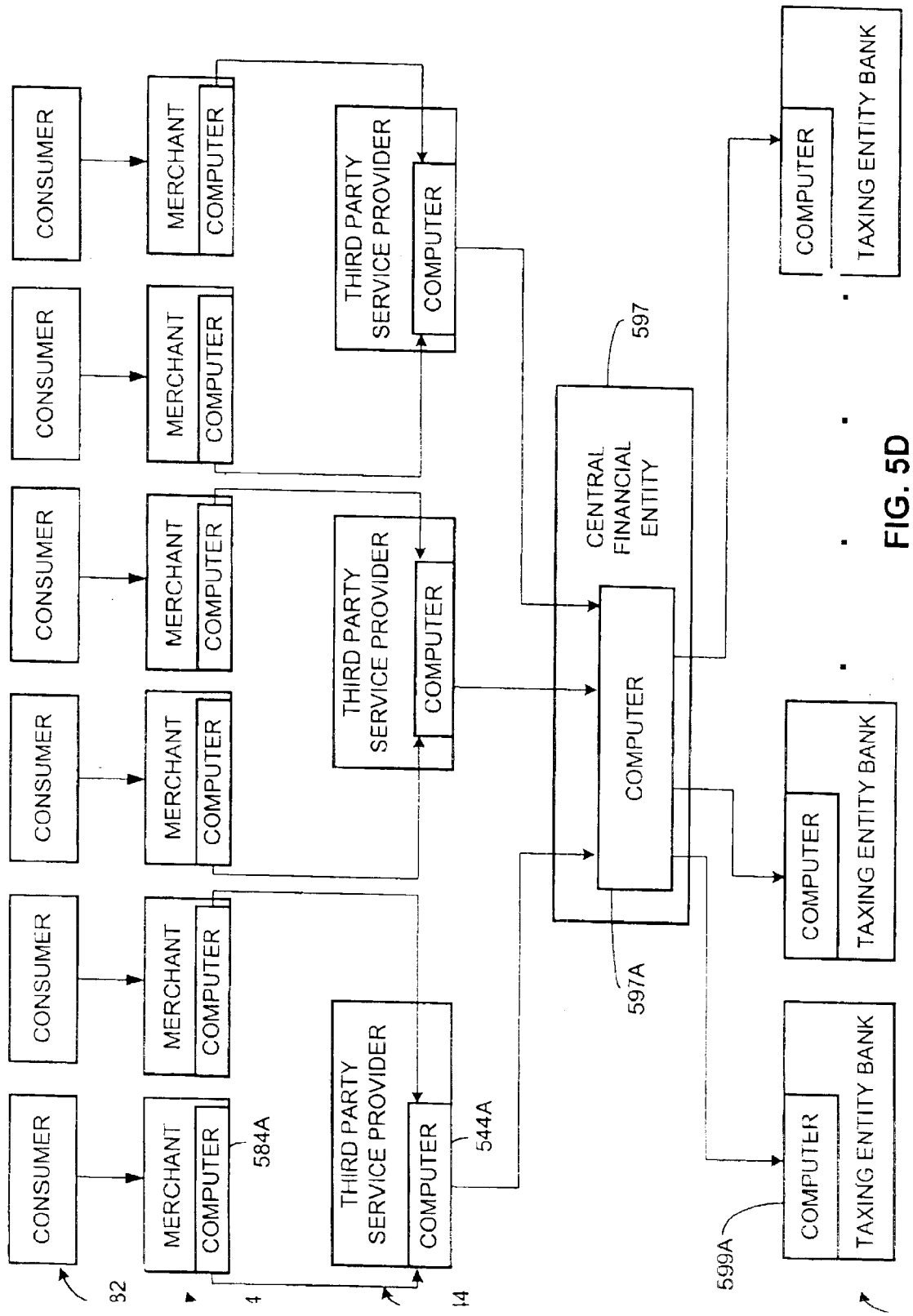
FIG. 5D is a pictorial illustration of the system of FIG. 5B with a plurality of merchants.

Similarly, the embodiment illustrated in FIG. 5B may also be implemented with a plurality of merchants. FIG. 5D illustrates a system according to the invention with a plurality of merchants 584, each having a computer such as computer 584A. FIG. 5D illustrates each of the merchants 584 transacting with consumers 582. FIG. 5D further illustrates the system with a plurality of third party service providers 544, each having a computer such as computer 544A. A single central financial entity 597 may be used to distribute taxes from the plurality of merchants 584 to the plurality of taxing entity banks 599 or financial account entities, each having a computer such as computer 599A.

It is understood that the communications between the various computers may be via secure networks.

Figure 7A:
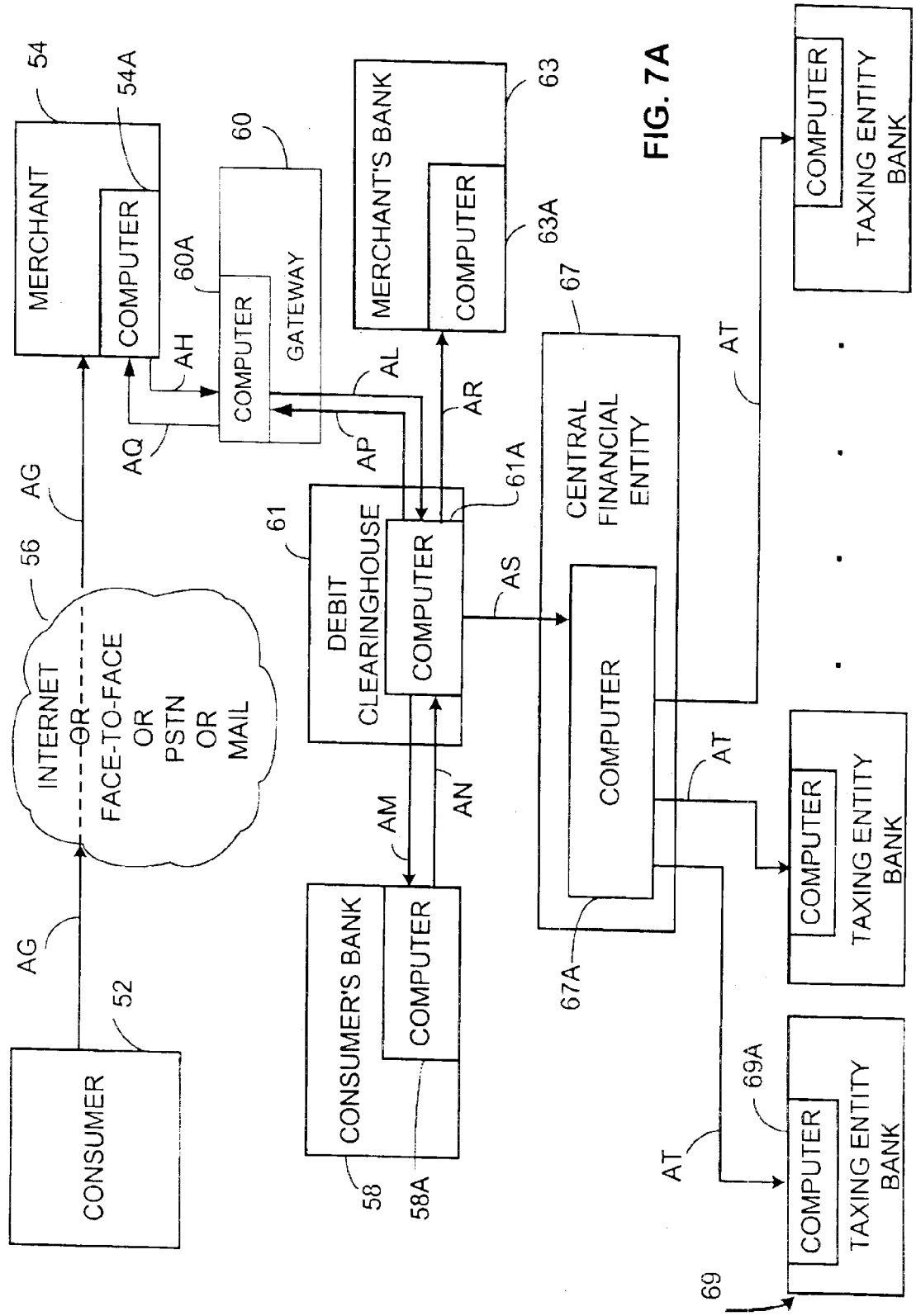
FIG. 7A is a pictorial illustration of a debit or truncated check transaction between a consumer and a merchant according to an embodiment of the invention.

FIG. 7A illustrates yet another embodiment of the invention. In this embodiment, a consumer 52 interacts with a merchant 54 to perform a transaction wherein the consumer 52 pays the merchant 54 by a debit card, a check card, a truncated check or other debit devices such as an electronic benefit transfer (EBT) card, or other (line AG). With these forms of payment, the merchant 54 receives payment from the consumer's account at a consumer's bank 58 or other institutions. At the completion of or during the transaction or at another time, the merchant 54, through a computer 54A, transmits transaction information, through a computer 60A at a gateway 60, to a computer 61A at a debit clearing house 61 (lines AH and AL). The debit clearinghouse may be an entity such as an automated clearing house (ACH). In other embodiments, the gateway 60 may be bypassed.

Figure 7B:
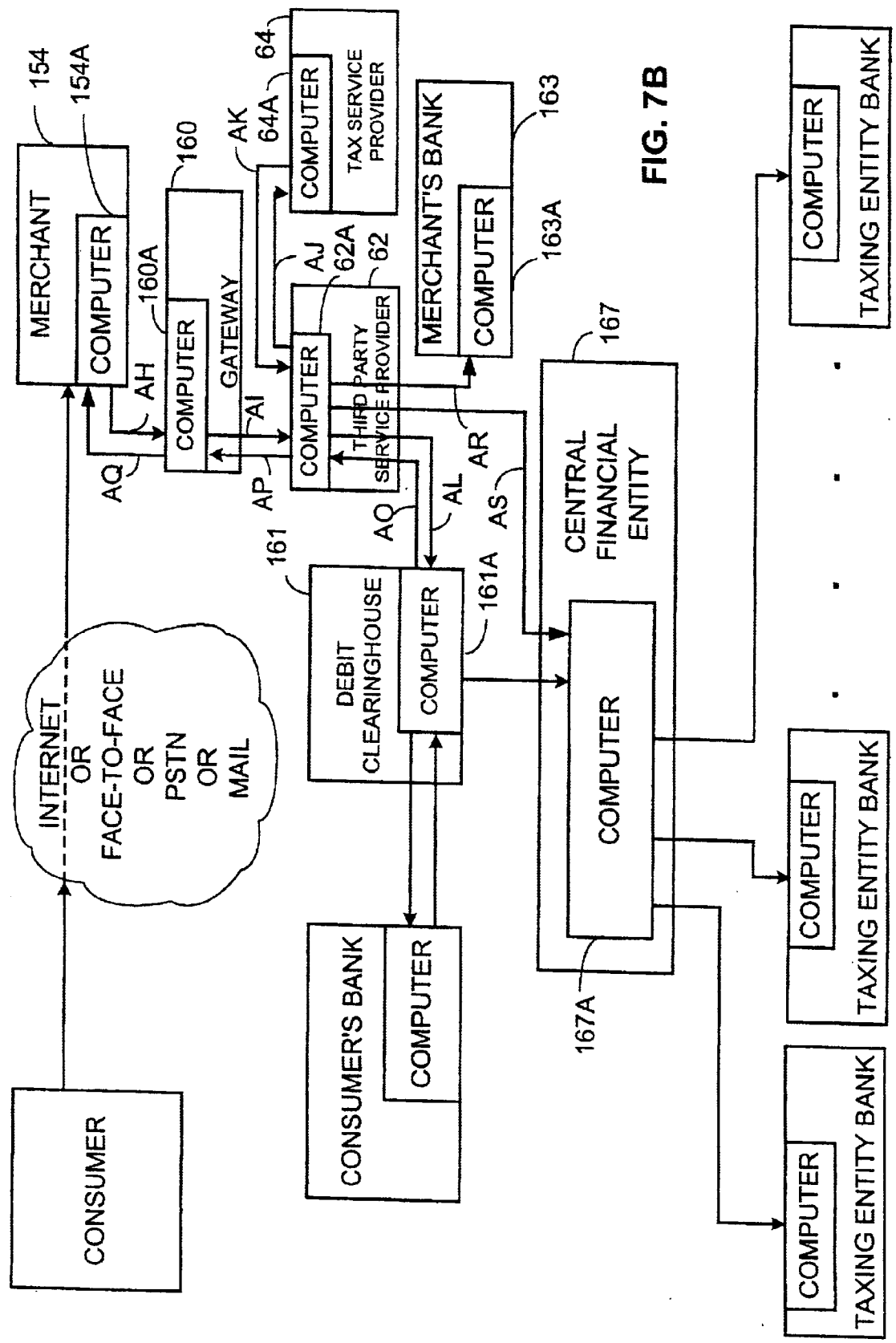
FIG. 7B is a pictorial illustration on of a debit or truncated check transaction between a consumer and a merchant according to another embodiment of the invention.

In other embodiments, as illustrated in FIG. 7B, a merchant 154 may use a computer 154A to transmit the transaction information, through a gateway computer 160A, to a computer 62A at a third-party service provider 62 (lines AH and AI in FIG. 7B). As noted above, the gateway 160 may be bypassed in other embodiments. The third-party service provider computer 62A may forward the information to a computer 64A at a tax service provider 64 (line AJ in FIG. 7B) for determination of allocation of tax funds to various taxing entities. The tax service provider computer 64A then returns the information, including the tax allocation information, to the third party service provider computer 62A (line AK in FIG. 7B), which forwards the information to a computer 161A at a debit clearing house 161. In other embodiments, the merchant's computer 154A may bypass the third-party service provider 62 and transmit the information directly to the tax service provider computer 64A. In further embodiments, the third party service provider 62 and the tax service provider 64 may be a single entity, and the third party service provider computer 62A and the tax service provider computer 64A may be a single unit.

Referring again to FIG. 7A, the debit clearing house computer 61A then relays the information to a computer 58A at the consumer's bank 58 (line AM) for certain transactions such as debit cards and other card types. For other modes of payments, such as check cards, an acquirer computer and/or other third party service computer may be used to clear the transaction. Others such as check guarantees, check truncations, check conversions or others may be cleared through a third party clearinghouse, the central financial entity computer 67A or other. The transaction information includes data relating to the distribution of any tax on the transaction. The computer 58A at the consumer's bank 58 may then transfer funds to the computer 61A at the debit clearinghouse 61 (line AN). The debit clearinghouse computer 61A may then transmit an approval signal to the computer 54A of the merchant 54 through the gateway computer 60A, via lines AP and AQ, as illustrated in FIG. 7A, and transfer funds to a computer 63A at the merchant's bank 63 in the amount of the transaction less the tax portion (line AR). Again, in other embodiments, the gateway 60 may be bypassed.

In the embodiment illustrated in FIG. 7B, the debit clearing house computer 161A may transfer the funds to the third-party service provider computer 62A (line AO in FIG. 7B). The third-party service provider computer 62A may transmit an approval signal to the merchant's computer 154A via the gateway computer 160A (lines AP and AQ in FIG. 7B). The third-party service provider computer 62A may transmit the non-tax portion of the funds to a computer 163A at a merchant's bank 163 (line AR in FIG. 7B), and may forward the tax portion, along with tax distribution information, to a computer 167A at a central financial entity 167 (line AS in FIG. 7B) for distribution to the various taxing entity banks or financial account entities. It is understood that the third-party service provider computer 62A may bypass the central financial entity 167 and transmit the tax portion directly to the various taxing entity banks or financial account entities.

In other embodiments, the debit clearinghouse computer 161A may forward the entire fund transfer to the central financial entity computer 167A for distribution to the merchant's bank's computer 163A and the various taxing entity banks or financial account entities. In a still further embodiment, the functions of the debit clearinghouse 161 and the central financial entity 167 may be performed by a single entity.

Referring again to FIG. 7A, the clearinghouse computer 61A may, either concurrently or subsequently, transfer the tax portion, along with distribution data, to a computer 67A at a central financial entity 67 (line AS) for distribution to computers 69A at the various taxing entity banks 69 (line AT) or other bank or financial authority.

In one embodiment, the functions of the clearinghouse 61 and the central financial entity 67 may be performed by a single entity. For example, the clearinghouse 61 may distribute funds to the taxing entities 69 or other bank or financial authority directly.

In another embodiment, the total amount of the transaction, including the tax portion, may be transferred at line AR to the merchant's bank's computer 63A. The merchant's bank's computer 63A may then transfer the tax portion, along with the distribution information, to the computer 67A at the central financial entity 67, with remainder of the funds being directed to a bank or financial account belonging to the merchant 54. In this regard, the merchant's bank's computer 63A may accumulate the tax funds from several transactions prior to submitting the information and the funds to the central financial entity's computer 67A. Thus, rather than a data and fund transfer for each transaction, the merchant's bank's computer may perform such a transfer periodically, such as on a daily, weekly and/or other basis.

In still further embodiments, the computer 58A at the consumer's bank may only transfer the amount of the transaction less the tax portion to the computer 61A at the debit clearinghouse 61 at line AN. The consumer's bank's computer 58A may transfer the tax portion with distribution information to the computer 67A at the central financial entity 67.

Figure 7C:
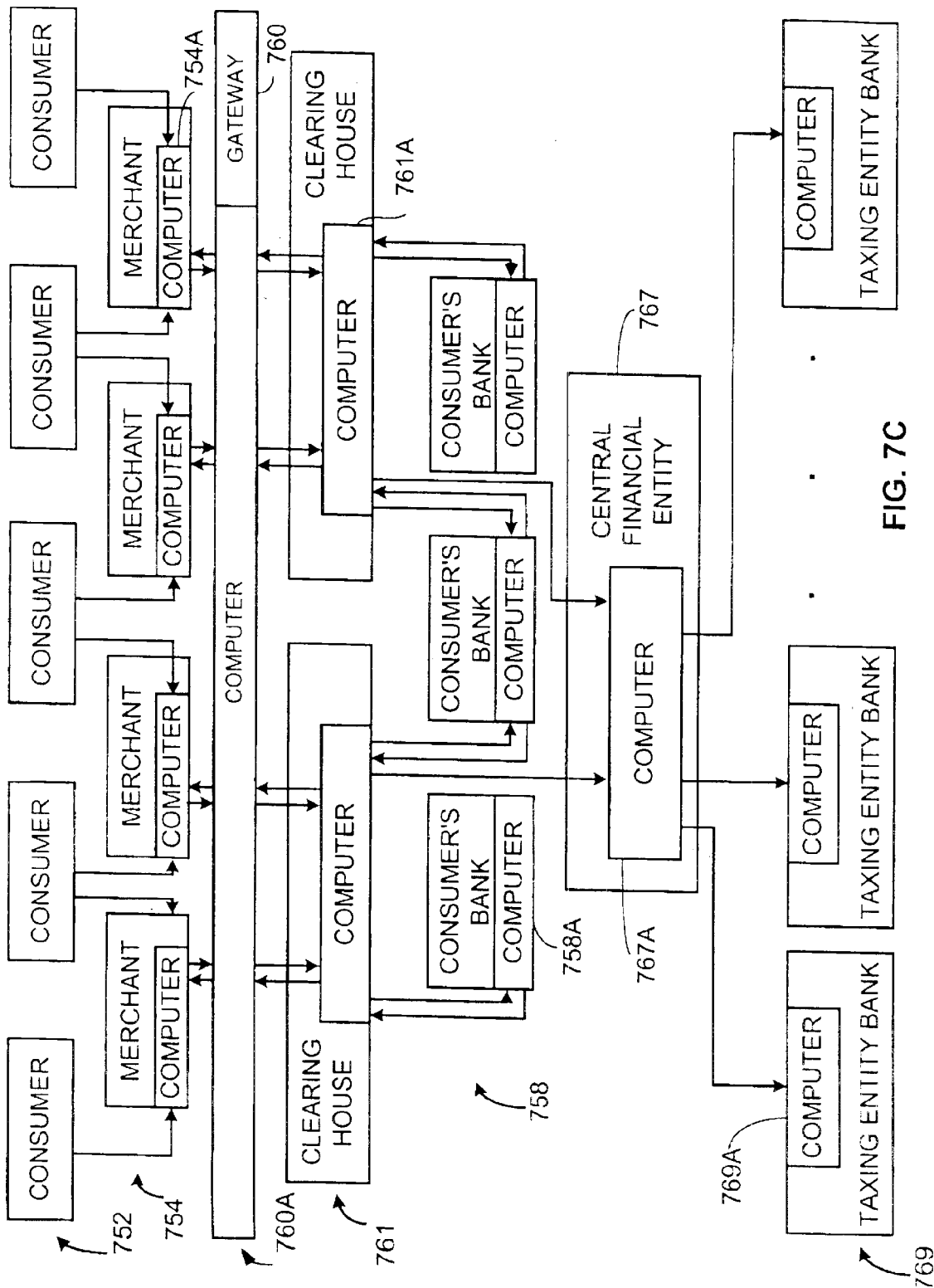
FIG. 7C is a pictorial illustration of the system of FIG. 7A with a plurality of merchants.

For the sake of simplicity, FIG. 7A illustrates a system with a single transaction involving a single merchant and a single consumer. As illustrated in FIG. 7C, however, a system according to the invention may be implemented with a plurality of merchants 754, each having a computer such as computer 754A. Each of the merchants 754 may transact with one or more of consumers 752, each of the consumers 752 being associated with one of a plurality of consumer's banks 758, each of the consumer's banks 758 having a computer such as computer 758A. Each of the merchants 754 may communicate with a computer 761A at a debit clearinghouse 761 via a computer 760A at a gateway 760 for transaction clearing purposes. A single central financial entity 767 having a computer 767A or a third party service provider computer or other may be used to distribute taxes to a plurality of taxing entity banks 769.

Figure 7D:
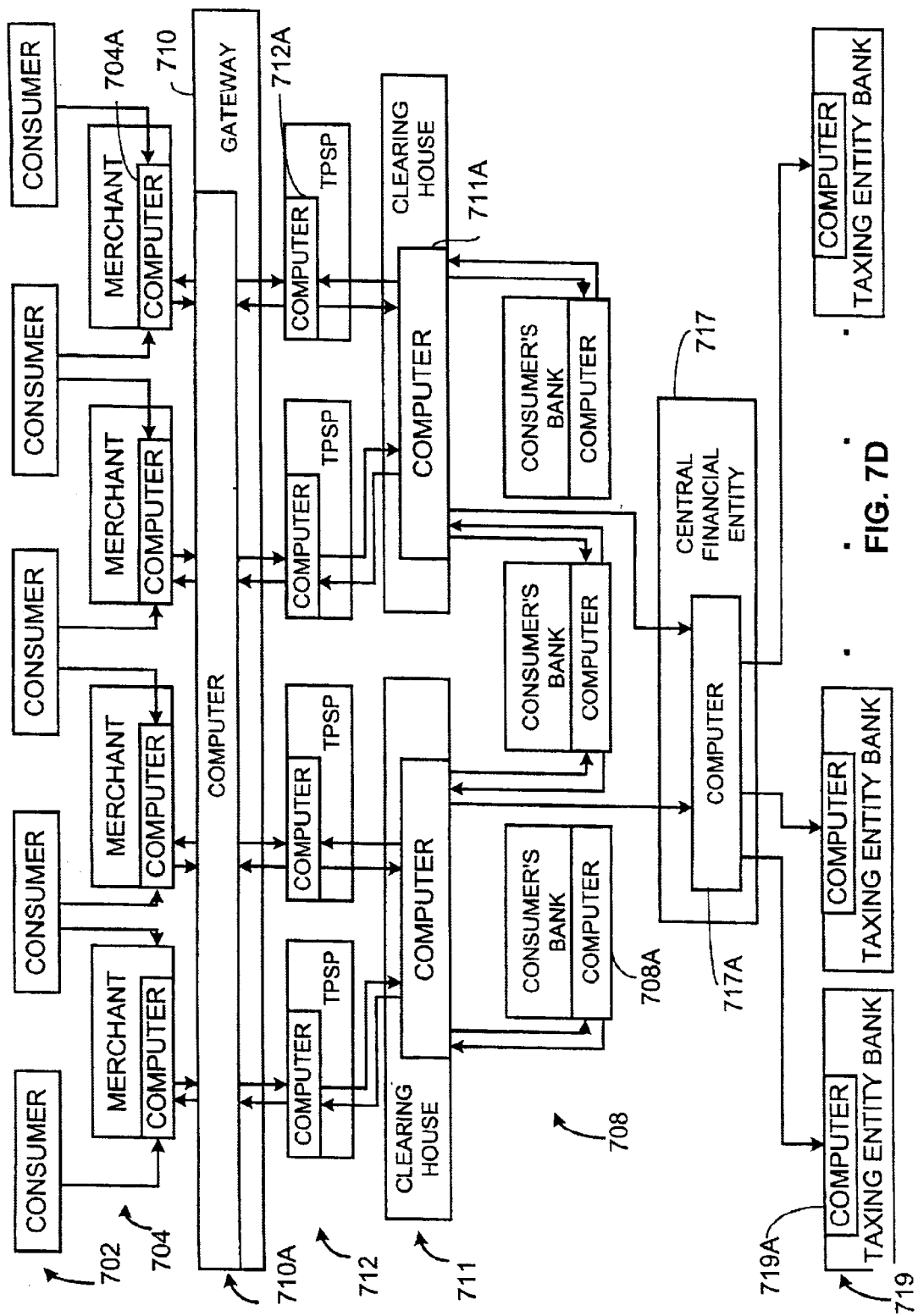
FIG. 7D is a pictorial illustration of the system of FIG. 7B with a plurality of merchants.

Similarly, the embodiment illustrated in FIG. 7B may also be implemented with a plurality of merchants. FIG. 7D illustrates a system according to the invention with a plurality of merchants 704, each having a computer such as computer 704A. FIG. 7D illustrates each of the merchants 704 transacting with consumers 702, each of the consumers 702 being associated with one of a plurality of consumer's banks 708, each of the consumer's banks 708 having a computer such as computer 708A. FIG. 7D further illustrates the system with a gateway 710, plurality of third party service providers 712, each having a computer such as computer 712A, and a plurality of debit clearing houses 711. A single central financial entity 717 may be used to distribute taxes from the plurality of merchants 704 to the plurality of taxing entity banks 719 or financial account entities, each having a computer such as computer 719A.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

What is claimed is:

1. A tax collection and distribution method, comprising:
   receiving a first debit account signal, said first signal including account information and a transaction amount, said transaction amount including a sale amount and a tax amount;
   determining an allocation of said tax amount to two or more taxing authorities;
   transmitting a second signal for receipt by a computer of a bank associated with said account information, said second signal including a request for a first payment associated with said sale amount and a second payment to said taxing authorities pursuant to said allocation; and
   receiving a third signal from said computer of said bank, said third signal including said first payment.

2. The method according to claim 1, wherein said first signal is received through a phone network.

3. The method according to claim 1, wherein said first signal is received through a computer network.

4. The method according to claim 3, wherein said computer network is the Internet.

5. The method according to claim 1, wherein said tax amount is determined by a merchant computer.

6. The method according to claim 1, wherein said tax amount is determined by a third party computer.

7. The method according to claim 1, wherein said tax amount is based on knowledge of the location of the consumer.

8. The method according to claim 1, wherein said tax amount is based on knowledge of the location of the merchant.

9. The method according to claim 1, wherein said tax amount is based on knowledge of the tax laws of taxing entities.

10. The method according to claim 1, wherein said tax amount is based on knowledge of tax distribution rules.

11. The method according to claim 1, wherein the allocation of said tax amount to two or more taxing authorities is determined by a merchant computer.

12. The method according to claim 1, wherein the allocation of said tax amount to two or more taxing authorities is determined by a third party computer.

13. The method according to claim 1, wherein the allocation of said tax amount to two or more taxing authorities is based on knowledge of tax distribution rules.

14. A tax collection and distribution system, comprising:
   means for receiving a first debit account signal, said first signal including account information and a transaction amount, said transaction amount including a sale amount and a tax amount;
   means for determining an allocation of said tax amount to two or more taxing authorities;
   means for transmitting a second signal for receipt by a computer of a bank associated with said account information, said second signal including a request for a first payment associated with said sale amount and a second payment to said taxing authorities pursuant to said allocation; and
   means for receiving a third signal from said computer of said bank, said third signal including said first payment.

15. The system according to claim 14, wherein said first signal is received through a phone network.

16. The system according to claim 14, wherein said first signal is received through a computer network.

17. The system according to claim 16, wherein said computer network is the Internet.

18. The system according to claim 14, wherein said tax amount is determined by a merchant computer.

19. The system according to claim 14, wherein said tax amount is determined by a third party computer.

20. The system according to claim 14, wherein said tax amount is based on knowledge of the location of the consumer.

21. The system according to claim 14, wherein said tax amount is based on knowledge of the location of the merchant.

22. The system according to claim 14, wherein said tax amount is based on knowledge of the tax laws of taxing entities.

23. The system according to claim 14, wherein said tax amount is based on knowledge of tax distribution rules.

24. The system according to claim 14, wherein the allocation of said tax amount to two or more taxing authorities is determined by a merchant computer.

25. The system according to claim 14, wherein the allocation of said tax amount to two or more taxing authorities is determined by a third party computer.

26. The system according to claim 14, wherein the allocation of said tax amount to two or more taxing authorities is based on knowledge of tax distribution rules.

27. A tax collection and distribution system, comprising:
   a receiving module adapted to receive a first debit account signal, said first signal including amount information and a transaction amount, said transaction amount including a sale amount and a tax amount;
   an allocation module adapted to determine an allocation of said tax amount to two or more taxing authorities;
   a transmitting module adapted to receive a second signal for receipt by a computer of a bank associated with said account information, said second signal including a request for a first payment associated with said sale amount and a second payment to said taxing authorities pursuant to said allocation; and
   said receiving module being further adapted to receive a third signal from said computer of said bank, said third signal including said first payment.

28. The system according to claim 27, wherein said first signal is received through a phone network.

29. The system according to claim 27, wherein said first signal is received through a computer network.

30. The system according to claim 29, wherein said computer network is the Internet.

31. The system according to claim 27, wherein said tax amount is determined by a merchant computer.

32. The system according to claim 27, wherein said tax amount is determined by a third party computer.

33. The system according to claim 27, wherein said tax amount is based on knowledge of the location of the consumer.

34. The system according to claim 27, wherein said tax amount is based on knowledge of the location of the merchant.

35. The system according to claim 27, wherein said tax amount is based on knowledge of the tax laws of taxing entities.

36. The system according to claim 27, wherein said tax amount is based on knowledge of tax distribution rules.

37. The system according to claim 27, wherein the allocation of said tax amount to two or more taxing authorities is determined by a merchant computer.

38. The system according to claim 27, wherein the allocation of said tax amount to two or more taxing authorities is determined by a third party computer.

39. The system according to claim 27, wherein the allocation of said tax amount to two or more taxing authorities is based on knowledge of tax distribution rules.

40. A program product, comprising machine readable program code for causing a machine to perform following method steps:
   receiving a first debit account signal, said first signal including account information and a transaction amount, said transaction amount including a sale amount and a tax amount;
   determining an allocation of said tax amount to two or more taxing authorities;
   transmitting a second signal for receipt by a computer of a bank associated with said account information, said second signal including a request for a first payment associated with said sale amount and a second payment to said taxing authorities pursuant to said allocation; and
   receiving a third signal from said computer of said bank, said third signal including said first payment.

41. The program product according to claim 40, wherein said first signal is received through a phone network.

42. The program product according to claim 40, wherein said first signal is received through a computer network.

43. The program product according to claim 40, wherein said computer network is the Internet.

44. The program product according to claim 40, wherein said tax amount is determined by a merchant computer.

45. The program product according to claim 40, wherein said tax amount is determined by a third party computer.

46. The program product according to claim 40, wherein said tax amount is based on knowledge of the location of the consumer.

47. The program product according to claim 40, wherein said tax amount is based on knowledge of the location of the merchant.

48. The program product according to claim 40, wherein said tax amount is based on knowledge of the tax laws of taxing entities.

49. The program product according to claim 40, wherein said tax amount is based on knowledge of tax distribution rules.

50. The program product according to claim 40, wherein the allocation of said tax amount to two or more taxing authorities is determined by a merchant computer.

51. The program product according to claim 40, wherein the allocation of said tax amount to two or more taxing authorities is determined by a third party computer.

52. The program product according to claim 40, wherein the allocation of said tax amount to two or more taxing authorities is based on knowledge of tax distribution rules.

53. A tax collection and distribution method, comprising:
transmitting a first debit account signal, said first signal including account information and a transaction amount, said transaction amount including a sale amount end a tax amount;
requesting an allocation of said tax amount to two or more taxing authorities;
permitting the transmission of a second signal for receipt by a computer of the bank associated with said account information, said second signal including a request for a first payment associated with said sale amount and a second payment to said taxing authorities pursuant to said allocation; and
permitting the transmission of a third signal from said computer of said bank, said third signal including said first payment.

54. The method according to claim 53, wherein said first signal is received through a phone network.

55. The method according to claim 53, wherein said first signal is received through a computer network.

56. The method according to claim 55, wherein said computer network is the Internet.

57. The method according to claim 53, wherein said tax amount is determined by a merchant computer.

58. The method according to claim 53, wherein said tax amount is determined by a third party computer.

59. The method according to claim 53, wherein said tax amount is based on knowledge of the location of the consumer.

60. The method according to claim 53, wherein said tax amount is based on knowledge of the location of the merchant.

61. The method according to claim 53, wherein said tax amount is based on knowledge of the tax laws of taxing entities.

62. The method according to claim 55, wherein said tax amount is based on knowledge of tax distribution rules.

63. The method according to claim 53, wherein the allocation of said tax amount to two or more taxing authorities is determined by a merchant computer.

64. The method according to claim 53, wherein the allocation of said tax amount to two or more taxing authorities is determined by a third party computer.

65. The method according to claim 53, wherein the allocation of said tax amount to two or more taxing authorities is based on knowledge of tax distribution rules.

66. A tax collection and distribution system, comprising:
a first module adapted to receive a first debit account signal, said first signal including account information and a transaction amount, said transaction amount including a sale amount and a tax amount;
a second module adapted to request the determination of an allocation of said tax amount to two or more taxing authorities;
a third module adapted to permit the transmission of a second signal for receipt by a computer of the bank associated with said account information, said second signal including a request for a first payment associated with said sale amount and a second payment to said taxing authorities pursuant to said allocation; and
a fourth module being further adapted to permit the transmission of a third signal from said computer of said bank, said third signal including said first payment.

67. The system according to claim 66, wherein said first signal is received through a phone network.

68. The system according to claim 66, wherein said first signal is received through a computer network.

69. The system according to claim 68, wherein said computer network is the Internet.

70. The system according to claim 66, wherein said tax amount is determined by a merchant computer.

71. The system according to claim 66, wherein said tax amount is determined by a third party computer.

72. The system according to claim 66, wherein said tax amount is based on knowledge of the location of the consumer.

73. The system according to claim 66, wherein said tax amount is based on knowledge of the location of the merchant.

74. The system according to claim 66, wherein said tax amount is based on knowledge of the tax laws of taxing entities.

75. The system according to claim 66, wherein said tax amount is based on knowledge of tax distribution rules.

76. The system according to claim 66, wherein the allocation of said tax amount to two or more taxing authorities is determined by a merchant computer.

77. The system according to claim 66, wherein the allocation of said tax amount to two or more taxing authorities is determined by a third party computer.

78. The system according to claim 66, wherein the allocation of said tax amount to two or more taxing authorities is based on knowledge of tax distribution rules.

79. A program product, comprising machine readable program code for causing a machine to perform following method steps:
using an account in a bank;
transmitting a first debit account signal, said first signal including account information and a transaction amount, said transaction amount including a sale amount and a tax amount;
requesting an allocation of said tax amount to two or more taxing authorities;
permitting the transmission of a second signal for receipt by a computer of the bank associated with said account information, said second signal including a request for a first payment associated with said sale amount and a second payment to said taxing authorities pursuant to said allocation; and
permitting the transmission of a third signal from said computer of said bank, said third signal including said first payment.

80. The program product according to claim 79, wherein said first signal is received through a phone network.

81. The program product according to claim 79, wherein said first signal is received through a computer network.

82. The program product according to claim 81, wherein said computer network is the Internet.

83. The system according to claim 79, wherein said tax amount is determined by a merchant computer.

84. The program product according to claim 79, wherein said tax amount is determined by a third party computer.

85. The program product according to claim 79, wherein said tax amount is based on knowledge of the location of the consumer.

86. The program product according to claim 79, wherein said tax amount is based on knowledge of the location of the merchant.

87. The program product according to claim 79, wherein said tax amount is based on knowledge of the tax laws of taxing entities.

88. The program product according to claim 79, wherein said tax amount is based on knowledge of tax distribution rules.

89. The program product according to claim 79, wherein the allocation of said tax amount to two or more taxing authorities is determined by a merchant computer.

90. The program product according to claim 79, wherein the allocation of said tax amount to two or more taxing authorities is determined by a third party computer.

91. The program product according to claim 79, wherein the allocation of said tax amount to two or more taxing authorities is based on knowledge of tax distribution rules.

92. A tax collection and distribution method, comprising:

transmitting a first debit account signal, said first signal including account information and a transaction amount, said transaction amount including a sale amount and a tax amount;

requesting an allocation of said tax amount to two or more taxing authorities;

permitting the updating of a database to reflect said allocation;

permitting the transmission of a second signal for receipt by a computer of the bank associated with said account information, said second signal including a request for a first payment associated with said transaction amount;

permitting the transmission of a third signal from said computer of said bank, said third signal including said first payment; and permitting the transmission of a fourth signal for receipt by a central entity computer, said fourth signal including information from said database, said information being indicative of said allocation, said fourth signal further including a payment associated with a cumulative tax amount.

93. The method according to claim 92, wherein said first signal is received through a phone network.

94. The method according to claim 92, wherein said first signal is received through a computer network.

95. The method according to claim 94, wherein said computer network is the Internet.

96. The method according to claim 92, wherein said tax amount is determined by a merchant computer.

97. The method according to claim 92, wherein said tax amount is determined by a third party computer.

98. The method according to claim 92, wherein said tax amount is based on knowledge of the location of the consumer.

99. The method according to claim 92, wherein said tax amount is based on knowledge of the location of the merchant.

100. The method according to claim 92, wherein said tax amount is based on knowledge of the tax laws of taxing entities.

101. The method according to claim 92, wherein said tax amount is based on knowledge of tax distribution rules.

102. The method according to claim 92, wherein the allocation of said tax amount to two or more taxing authorities is determined by a merchant computer.

103. The method according to claim 92, wherein the allocation of said tax amount to two or more taxing authorities is determined by a third party computer.

104. The method according to claim 92, wherein the allocation of said tax amount to two or more taxing authorities is based on knowledge of tax distribution rules.

* * * * *